United States Patent
Fukada

(10) Patent No.: US 12,197,490 B2
(45) Date of Patent: Jan. 14, 2025

(54) MEDIA FILE GENERATION APPARATUS, MEDIA FILE PLAYBACK APPARATUS, MEDIA FILE GENERATION METHOD, MEDIA FILE PLAYBACK METHOD, PROGRAM, AND STORAGE MEDIUM

(71) Applicant: CANON KABUSHIKI KAISHA, Tokyo (JP)

(72) Inventor: Masanori Fukada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/189,040

(22) Filed: Mar. 23, 2023

(65) Prior Publication Data
US 2023/0229689 A1    Jul. 20, 2023

Related U.S. Application Data

(63) Continuation of application No. PCT/JP2021/034698, filed on Sep. 22, 2021.

(30) Foreign Application Priority Data

Sep. 28, 2020  (JP) ................. 2020-162751
Dec. 18, 2020  (JP) ................. 2020-210739

(51) Int. Cl.
*G06F 16/438* (2019.01)
*G06F 16/483* (2019.01)
*G06F 16/487* (2019.01)

(52) U.S. Cl.
CPC ........ *G06F 16/4393* (2019.01); *G06F 16/483* (2019.01); *G06F 16/487* (2019.01)

(58) Field of Classification Search
CPC .. G06F 16/4393; G06F 16/483; G06F 16/487; H04N 9/8205; H04N 21/8106
See application file for complete search history.

(56) References Cited

U.S. PATENT DOCUMENTS

| | | | |
|---|---|---|---|
| 2006/0187331 A1* | 8/2006 | Watanabe | H04N 5/262 348/333.01 |
| 2009/0208119 A1 | 8/2009 | Lee | |
| 2020/0145705 A1* | 5/2020 | Hannuksela | H04N 21/845 |

FOREIGN PATENT DOCUMENTS

| | | |
|---|---|---|
| JP | 2007013918 A | 1/2007 |
| JP | 2010252076 A | 11/2010 |
| JP | 2011078139 A | 4/2011 |

(Continued)

OTHER PUBLICATIONS

Frederic Maze et al., [HEIF] Slideshow, International Organisation for Standardisation, ISO/IEC JTC1/SC29/WG11, Coding of Moving Pictures and Audio, Oct. 2019, Geneva, CH, Doc. No. MPEG2019/m50833.

*Primary Examiner* — Cao H Nguyen
(74) *Attorney, Agent, or Firm* — Canon U.S.A., Inc. IP Division

(57) ABSTRACT

A plurality of pieces of image data and audio data are determined from a data area. Information on a slideshow group associated with a plurality of pieces of identification information identifying the respective pieces of image data and identification information identifying the audio data, and location information indicating locations, in the data area, of the plurality of pieces of image data and the audio data are stored in a metadata area. The metadata, the plurality of pieces of image data, and the audio data are stored in a single media file.

16 Claims, 15 Drawing Sheets

(56) References Cited

FOREIGN PATENT DOCUMENTS

| | | | |
|---|---|---|---|
| JP | 2012010405 | * | 9/2011 |
| JP | 2012010405 A | | 1/2012 |
| WO | 2007043823 A1 | | 4/2007 |

* cited by examiner

FIG. 6

```
aligned(8) class SlideshowWithAudioGroupBox ——— 601      602
    extends EntityToGroupBox(grouping_type='slda' version, flags) {
}
```

FIG. 7

```
aligned(8) class EntityToGroupBox(grouping_type, version, flags)
extends FullBox(grouping_type, version, flags) {
    unsigned int(32) group_id;                              ——— 701
    unsigned int(32) num_entities_in_group;                 ——— 702
    for(i=0; i<num_entities_in_group; i++)
        unsigned int(32) entity_id;                         ——— 703
// the remaining data may be specified for a particular grouping_type
}
```

FIG. 8

```
FileTypeBox 'ftyp': major-brand='mif1' minorVersion=0 compatible-brands='heic'
MetaBox 'meta': (container)
    HandlerBox 'hdlr': 'pict'
    PrimaryItemBox 'pitm': item_ID=2049;  ──── 801
    ItemInfoBox 'iinf': entry_count=48
        1)'infe': item_ID=2001, item_type='hvc1';
        ....                                              ⎫
        48)'infe': item_ID=2048, item_type='hvc1';        ⎬ ─ 802
        49)'infe': item_ID=2049, item_type='grid';        ⎪
        50)'infe': item_ID=2050, item_type='hvc1';        ⎭
    ItemLocationBox 'iloc': item_count=48
        item_ID=2001, construction_method=0, data_reference_index=0, base_offset=0,
                extent_count=1, {extent_offset=A, extent_length=B};        ⎫
        ....                                                                ⎬ ─ 803
        item_ID=2049, construction_method=1, data_reference_index=0, base_offset=0,
                extent_count=1, {extent_offset=0, extent_length=8}
        item_ID=2050, construction_method=0, data_reference_index=0, base_offset=0,
                extent_count=1, {extent_offset=A2, extent_length=B2};
                                                                          804
    ItemReferenceBox 'iref':                                                ⎫
        referenceType='dimg',from_item_ID=2049,ref_count=4,to_item_ID=2045,2046,2047,2048; ⎬
        referenceType='thmb',from_item_ID=2050,ref_count=1,to_item_ID=2049; ⎭
    ItemPropertiesBox 'iprp':
        ItemPropertyContainerBox 'ipco':   ⎫
        1)'hvcC';                          ⎪
        2)'ispe';                          ⎬ ─ 805
        3)'ispe';                          ⎪
        4)'ispe';                          ⎭
        ItemPropertyAssociation 'ipma': entry_count=48  ⎫
        1)    item_ID=2001, association_count=2
                    essential=1, property_index=1;
                    essential=0, property_index=2;
        ....
        45)   item_ID=2045, association_count=2
                    essential=1, property_index=1;
                    essential=0, property_index=3;         ⎬ ─ 806
        ....
        49)   item_ID=2049, association_count=2
                    essential=1, property_index=1;
                    essential=0, property_index=2;
        50)   item_ID=2050, association_count=2
  807           essential=1, property_index=1;
                    essential=1, property_index=4;         ⎭
    ItemDataBox 'idat':
    GroupsListBox 'grpl':
        SlideshowWithAudioEntityToGroupBox 'slda': flag=0, group_id=1001,
            num_entities_in_group=46
            1) entity_id=1;
            2) entity_id=2001;                                  ⎬ ─ 808
            ....
            48) entity_id=2044;
            49) entity_id=2049;
                                                                          809
MovieBox 'moov':                                                            ⎫
    MoovieHeaderBox 'mvhd': CreationTime=3214567890 ModificationTime=3214567890
            TimeScale=1000 Duration=8704 NextTrackID=2;
    TrackBox 'trak':
        TrackHeaderBox 'tkhd': flags=3 TrackID=1 CreationTime=3214567890
                    ModificationTime=3214567890 Duration=8704 Volume=1.00
        MediaBox 'mdia':
            MediaHeaderBox 'mdhd': CreationTime=3214567890 ModificationTime=3214567890
                    TimeScale=48000 Duration=417792 LanguageCode=und
            HandlerBox 'hdlr': hdlrType=soun Name="HEIF/aac-lc/SoundHandler"
            MediaInformationBox 'minf':
   810          SoundMediaHeaderBox 'smhd':                                ⎬
                DataInformationBox 'dinf':
                SampleTableBox 'stbl':                                      ⎭
MediaDataBox 'mdat':
```

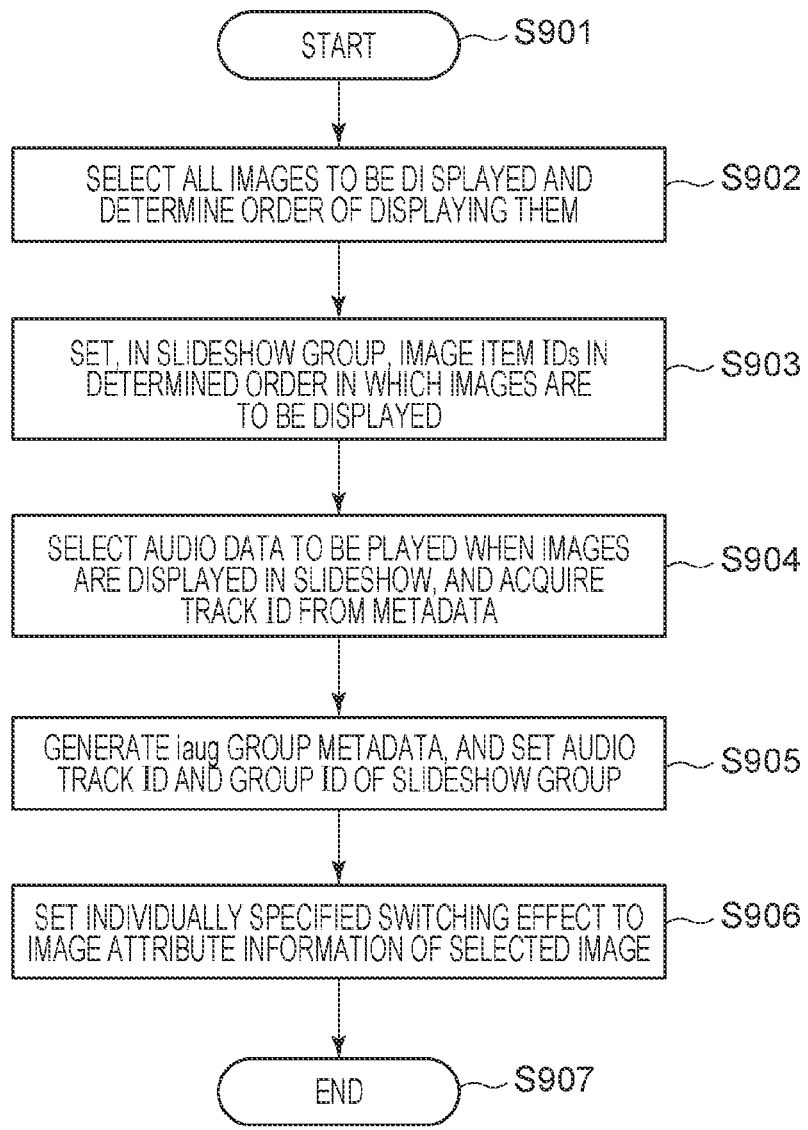

FIG. 10

```
FileTypeBox 'ftyp': major-brand='mif1' minorVersion=0 compatible-brands='heic' 'unif'  ───1001
MetaBox 'meta': (container)
    HandlerBox 'hdlr': 'pict'
    PrimaryItemBox 'pitm': item_ID=2001;   ───1002
    ItemInfoBox 'iinf': entry_count=48
        1) 'infe': item_ID=2001, item_type='hvc1';  ⎫
           ....                                     ⎬─1003
        48) 'infe': item_ID=2048, item_type='hvc1'; ⎭
    ItemLocationBox 'iloc': item_count=48
        item_ID=2001, construction_method=0, data_reference_index=0, base_offset=0,  ⎫
                  extent_count=1, {extent_offset=A, extent_length=B};                ⎬─1004
        ....                                                                         │
        item_ID=2048, construction_method=0, data_reference_index=0, base_offset=0,  │
                  extent_count=1, {extent_offset=A1, extent_length=B1};              ⎭
    ItemPropertiesBox 'iprp':
        ItemPropertyContainerBox 'ipco':
            1) 'hvcC';       ⎫
            2) 'ispe';       ⎬─1005
            3) 'wipe';       ⎭
        ItemPropertyAssociation 'ipma': entry_count=48   ⎫
            1)   item_ID=2001, association_count=2       │
                    essential=1, property_index=1;       │
                    essential=0, property_index=2;       │
                    essential=0, property_index=3;       ⎬─1006
            ....                                         │
            48)  item_ID=2048, association_count=2       │
                    essential=1, property_index=1;       │
                    essential=0, property_index=2;       ⎭
    GroupsListBox 'grpl':
        SlideshowEntityToGroupBox 'slid': flag=0, group_id=1001, num_entities_in_group=48  ⎫
            1) entity_id=2001;                                                             ⎬─1007
            3) entity_id=2002;                                                             │
            ....                                                                           │
            48) entity_id=2048;                                                            ⎭
        iaugEntityToGroupBox 'iaug': flag=0, group_id=1002,  ⎫
            num_entities_in_group=2                          ⎬─1008
            1) entity_id=1;                                  │
            2) entity_id=1001;                               ⎭
MovieBox 'moov':                                                                    ⎫  1009
    MoovieHeaderBox 'mvhd': CreationTime=3214567890 ModificationTime=3214567890     │
                TimeScale=1000 Duration=8704 NextTrackID=2;                         │
    TrackBox 'trak':                                                                │
        TrackHeaderBox 'tkhd': flags=3 TrackID=1 CreationTime=3214567890            │
                    ModificationTime=3214567890 Duration=8704 Volume=1.00           ⎬
        MediaBox 'mdia':                                                            │
            MediaHeaderBox 'mdhd': CreationTime=3214567890 ModificationTime=3214567890
                        TimeScale=48000 Duration=417792 LanguageCode=und            │
            HandlerBox 'hdlr': hdlrType=soun Name="HEIF/aac-lc/SoundHandler"        │
            MediaInformationBox 'minf':                                             │
                SoundMediaHeaderBox 'smhd':                                         │
       1010     DataInformationBox 'dinf':                                          │
                SampleTableBox 'stbl':                                              ⎭
MediaDataBox 'mdat':
```

FIG. 11

```
aligned(8) class SlideshowEntityGroupBox                              1101
    extends EntityToGroupBox(grouping_type='slid' version, flags) {
}
```

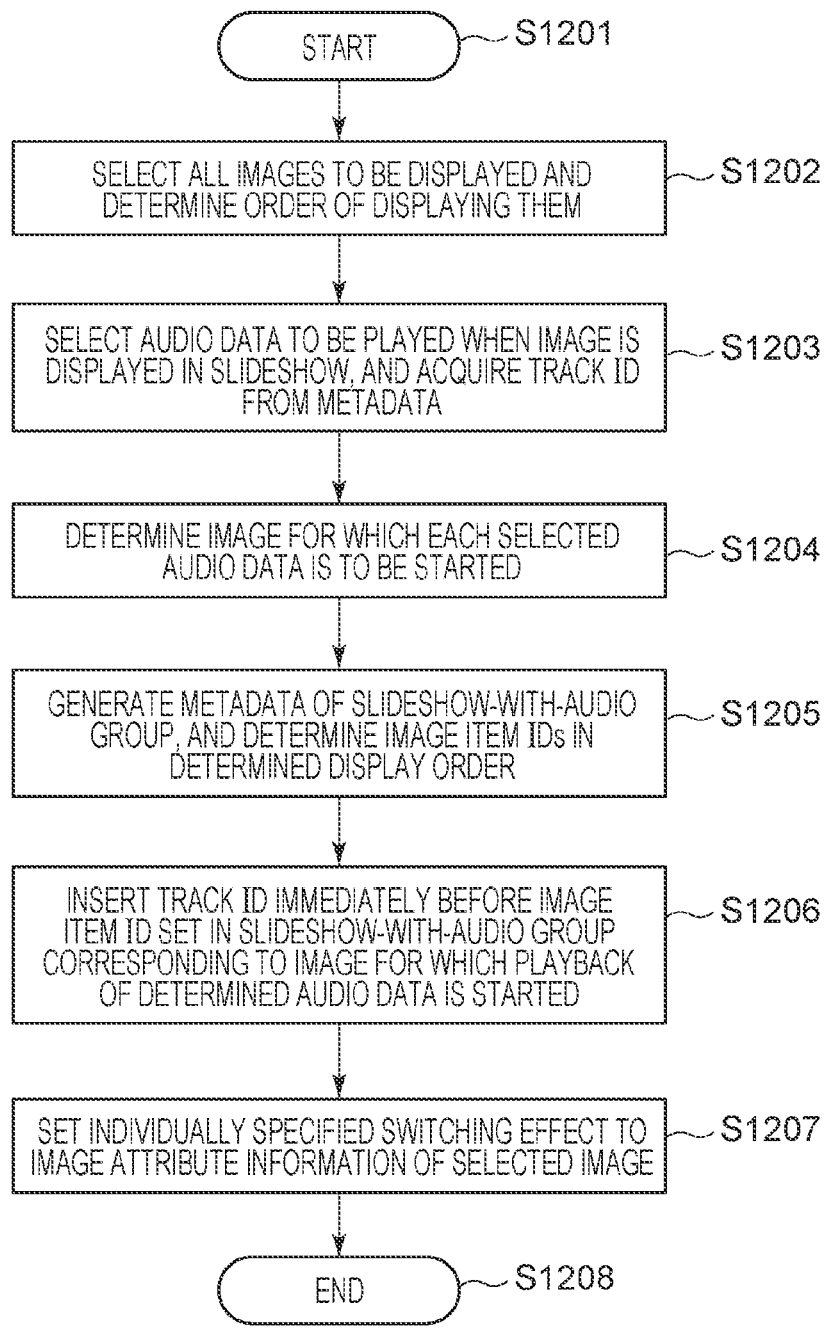

FIG. 13

```
aligned(8) class SlideshowWithAudioGroupBox   ~1301        1302
    extends EntityToGroupBox(grouping_type='slda' version, flags)
{                                             1303
        for(i=0; i<num_entities_in_group; i++)
            unsigned int(8) flags;    ————1304
}
```

FIG. 14

```
aligned(8) class SlideshowWithAudioGroupBox
    extends EntityToGroupBox(grouping_type='slda' version, flags)
{
        for(i=0; i<num_entities_in_group; i++)
            bit(1) flag;                      ~1401
        if(num_entities_in_group%8 != 0)
            bit(8-num_entities_in_group%8) pad;  ~1402
}
```

FIG. 15

```
FileTypeBox 'ftyp': major-brand='mif1' minorVersion=0 compatible-brands='heic'
MetaBox 'meta': (container)
        HandlerBox 'hdlr': 'pict'
        PrimaryItemBox 'pitm': item_ID=1;          1501
        ItemInfoBox 'iinf': entry_count=48
                1)'infe': item_ID=1, item_type='hvc1';
                ....                                      }  1502
                48)'infe': item_ID=48, item_type='hvc1';
        ItemLocationBox 'iloc': item_count=48
                item_ID=1, construction_method=0, data_reference_index=0, base_offset=0,  }  1503
                        extent_count=1, {extent_offset=A, extent_length=B};
                ....
                item_ID=48, construction_method=0, data_reference_index=0, base_offset=0,
                        extent_count=1, {extent_offset=A1, extent_length=B1};
        ItemPropertiesBox 'iprp':
                ItemPropertyContainerBox 'ipco':    }  1504
                        1)'hvcC';
                        2)'ispe';
                ItemPropertyAssociation 'ipma': entry_count=48
                1)     item_ID=1, association_count=2
                                essential=1, property_index=1;
                                essential=0, property_index=2;
                2)     item_ID=2, association_count=2
                                essential=1, property_index=1;    }  1505
                                essential=0, property_index=2;
                ....
                48)    item_ID=48, association_count=2
                                essential=1, property_index=1;
                                essential=0, property_index=2;
        GroupsListBox 'grpl':
                SlideshowWithAudioEntityToGroupBox 'sida': flag=0, group_id=1001,
                        num_entities_in_group=50
                1) entity_id=1; flag = 1;
                2) entity_id=1; flag = 0;
                3) entity_id=2; flag = 0;                          }  1506
                ....
                25) entity_id=2; flag = 1;
                ....
                50) entity_id=48; flag = 0;
MovieBox 'moov':
        MoovieHeaderBox 'mvhd': CreationTime=3214567890 ModificationTime=3214567890    1507
                        TimeScale=1000 Duration=8704 NextTrackID=3;
        TrackBox 'trak':
                TrackHeaderBox 'tkhd': flags=3 TrackID=1 CreationTime=3214567890
                                ModificationTime=3214567890 Duration=8704 Volume=1.00
                MediaBox 'mdia':
                        MediaHeaderBox 'mdhd': CreationTime=3214567890 ModificationTime=3214567890
                                        TimeScale=48000 Duration=417792 LanguageCode=und
                        HandlerBox 'hdlr': hdlrType=soun Name=""
                        MediaInformationBox 'minf':
                                SoundMediaHeaderBox 'smhd':
                                DataInformationBox 'dinf':
                                SampleTableBox 'stbl':
        TrackBox 'trak':
                TrackHeaderBox 'tkhd': flags=3 TrackID=2 CreationTime=3214567890
                                ModificationTime=3214567890 Duration=5604 Volume=1.00
                MediaBox 'mdia':
                        MediaHeaderBox 'mdhd': CreationTime=3214567890 ModificationTime=3214567890
                                        TimeScale=48000 Duration=268992 LanguageCode=und
                        HandlerBox 'hdlr': hdlrType=soun Name=""
                        MediaInformationBox 'minf':
  1509                         SoundMediaHeaderBox 'smhd':
                                DataInformationBox 'dinf':
                                SampleTableBox 'stbl':
MediaDataBox 'mdat':                                                                    1508
```

FIG. 17

```
FileTypeBox 'ftyp': major-brand='mif1' minorVersion=0 compatible-brands='heic' 'unif'         1701
MetaBox 'meta': (container)
    HandlerBox 'hdlr': 'pict'
    PrimaryItemBox 'pitm': item_ID=2001;          1702
    ItemInfoBox 'iinf': entry_count=48
        1)'infe': item_ID=2001, item_type='hvc1';  ⎫
        ....                                       ⎬ 1703
        48)'infe': item_ID=2048, item_type='hvc1'; ⎭
    ItemLocationBox 'iloc': item_count=48
        item_ID=2001, construction_method=0, data_reference_index=0, base_offset=0, ⎫
                extent_count=1, {extent_offset=A, extent_length=B};                 ⎬ 1704
        ....                                                                         ⎪
        item_ID=2048, construction_method=0, data_reference_index=0, base_offset=0, ⎪
                extent_count=1, {extent_offset=A1, extent_length=B1};                ⎭
    ItemPropertiesBox 'iprp':
        ItemPropertyContainerBox 'ipco': ⎫
            1)'hvcC';                    ⎬ 1705
            2)'ispe';                    ⎪
            3)'wipe';                    ⎭
        ItemPropertyAssociation 'ipma': entry_count=48 ⎫
            1)   item_ID=2001, association_count=2     ⎪
                        essential=1, property_index=1; ⎪
                        essential=0, property_index=2; ⎬ 1706
                        essential=0, property_index=3; ⎪
                ....                                   ⎪
            48)  item_ID=2048, association_count=2     ⎪
                        essential=1, property_index=1; ⎪
                        essential=0, property_index=2; ⎭
    GroupsListBox 'grpl':
        SlideshowEntityToGroupBox 'slid': flag=0, group_id=1001,num_entities_in_group=48 ⎫ 1707
            1) entity_id=2001;                                                            ⎬
            3) entity_id=2002;                                                            ⎪
            ....                                                                          ⎭
            48) entity_id=2048;
        IaugEntityToGroupBox 'iaug': flag=0, group_id=1002, ⎫
            num_entities_in_group=2                          ⎬ 1708
            1) entity_id=1003;                               ⎪
            2) entity_id=1001;                               ⎭
        altrEntityToGroupBox 'altr': flag=0, group_id=1003 ⎫
            num_entities_in_group=2                         ⎬ 1709
            1) entity_id=1;                                 ⎪
            2) entity_id=2;                                 ⎭                      1710
MovieBox 'moov':                                                                    ⎫
    MoovieHeaderBox 'mvhd': CreationTime=3214567890 ModificationTime=3214567890     ⎪
                TimeScale=1000 Duration=8704 NextTrackID=2;                          ⎪
    TrackBox 'trak':                                                                ⎪
        TrackHeaderBox 'tkhd': flags=3 TrackID=1 CreationTime=3214567890            ⎪
                    ModificationTime=3214567890 Duration=8704 Volume=1.00           ⎪
        MediaBox 'mdia':                                                            ⎪
            MediaHeaderBox 'mdhd': CreationTime=3214567890 ModificationTime=3214567890
                    TimeScale=48000 Duration=417792 LanguageCode=und                ⎬
            HandlerBox 'hdlr': hdlrType=soun Name="HEIF/aac-lc/SoundHandler"        ⎪
            MediaInformationBox 'minf':                                             ⎪
                SoundMediaHeaderBox 'smhd':                                         ⎪
                DataInformationBox 'dinf':                                          ⎪
                SampleTableBox 'stbl':                                              ⎪
    TrackBox 'trak':                                                                ⎪
        TrackHeaderBox 'tkhd': flags=3 TrackID=2 CreationTime=3214567890            ⎪
                    ModificationTime=3214567890 Duration=5604 Volume=1.00           ⎪
        MediaBox 'mdia':                                                            ⎪
            MediaHeaderBox 'mdhd': CreationTime=3214567890 ModificationTime=3214567890
                    TimeScale=48000 Duration=266992 LanguageCode=und                ⎪
            HandlerBox 'hdlr': hdlrType=soun Name=""                                ⎪
            MediaInformationBox 'minf':                                             ⎪
      1712      SoundMediaHeaderBox 'smhd':                                         ⎪
                DataInformationBox 'dinf':                                          ⎪
                SampleTableBox 'stbl':                                              ⎭
MediaDataBox 'mdat':                                                              1711
```

MEDIA FILE GENERATION APPARATUS, MEDIA FILE PLAYBACK APPARATUS, MEDIA FILE GENERATION METHOD, MEDIA FILE PLAYBACK METHOD, PROGRAM, AND STORAGE MEDIUM

CROSS-REFERENCE TO RELATED APPLICATIONS

This application is a Continuation of International Patent Application No. PCT/JP2021/034698, filed Sep. 22, 2021, which claims the benefit of Japanese Patent Application No. 2020-162751, filed Sep. 28, 2020, and Japanese Patent Application No. 2020-210739, filed Dec. 18, 2020, all of which are hereby incorporated by reference herein in their entireties.

TECHNICAL FIELD

The present disclosure relates to a media file generation apparatus, a media file playback apparatus, a media file generation method, a media file playback method, a program, and a storage medium.

BACKGROUND ART

There is known a technique for storing an item such as an image item and a track such as a moving image track, an audio track, and/or the like in an image file according to HEIF (High Efficiency Image File Format) (see PTL 1).

CITATION LIST

Patent Literature

PTL 1: U.S. Patent Application Publication No. 2020/145705

SUMMARY OF INVENTION

Various embodiments of the present disclosure solve a problem in generating/playing back a media file containing information for continuously displaying a plurality of images with audio.

According to one embodiment, the present invention provides a media file generation apparatus configured to generate a media file according to a predetermined file format having a data area for storing image data and audio data and a metadata area for storing metadata related to the image data and the audio data, the media file generation apparatus including determination means configured to determine a plurality of pieces of image data and audio data from the data area, metadata processing means configured to store, in the metadata area, information on a slideshow group associated with a plurality of pieces of identification information identifying the respective pieces of image data and identification information identifying the audio data, and location information indicating locations, in the data area, of the plurality of pieces of image data and the audio data, and storage means configured to store the metadata, the plurality of pieces of image data, and the audio data in a single media file.

Further features of the present disclosure will become apparent from the following description of exemplary embodiments with reference to the attached drawings.

BRIEF DESCRIPTION OF DRAWINGS

FIG. 6 is a diagram illustrating an example of a data format of SlideshowWithAudioGroupBox according to the first embodiment.

FIG. 7 is a diagram illustrating a data format of EntityToGroupBox.

FIG. 8 is a diagram illustrating an example of an output HEIF file according to the first embodiment.

FIG. 9 is a flowchart illustrating another example of a process performed by a media file generation apparatus to generate metadata of a slideshow with audio according to the first embodiment.

FIG. 10 is a diagram illustrating another example of an output HEIF file according to the first embodiment.

FIG. 11 is a diagram illustrating a data format of SlideshowEntityToGroupBox.

FIG. 12 is a flowchart illustrating a process performed by a media file generation apparatus to generate metadata of a slideshow with audio according to a second embodiment.

FIG. 13 is a diagram illustrating an example of a data format of SlideshowWithAudioGroupBox according to the second embodiment.

FIG. 14 is a diagram illustrating another example of a data format of SlideshowWithAudioGroupBox according to the second embodiment.

FIG. 15 is a diagram illustrating an example of an output HEIF file according to the second embodiment.

FIG. 17 is a diagram illustrating another example of an output HEIF file according to the first embodiment.

DESCRIPTION OF EMBODIMENTS

Figure 1:
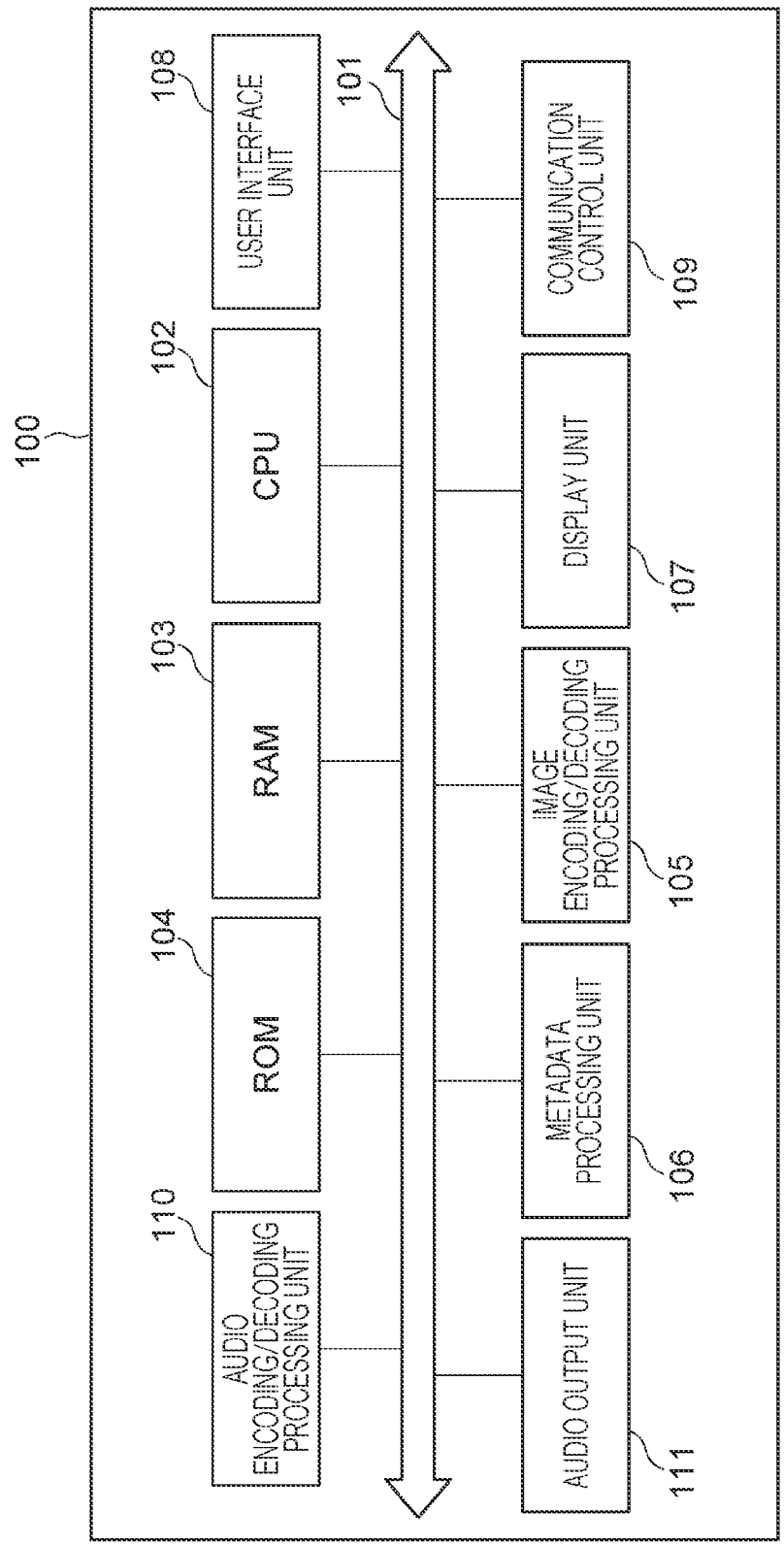
FIG. 1 is a block diagram illustrating a configuration of a media file generation apparatus.

Embodiments are described below in detail with reference to drawings. Note that the scope of the present invention is not limited by the embodiments described below. Also note that although a plurality of features are described in the embodiments, all those features are not essential to the invention. Still note that a plurality of features may be arbitrary combined. In the accompanying drawings, the same or similar elements are denoted by the same reference numerals, and redundant descriptions thereof is omitted.

First Embodiment

Hardware Configuration

FIG. 1 is a diagram illustrating an example of a configuration of a media file generation apparatus 100. In the media file generation apparatus 100, a CPU 102, a RAM 103 serving as a temporary storage apparatus used when a system program is executed, and a ROM 104 serving as a nonvolatile storage apparatus in which the system program is stored, are connected to a system bus 101. The system program and an application program are loaded from the ROM 104 into the RAM 103 and executed by the CPU 102.

Furthermore, an encoding/decoding unit 105, a metadata processing unit 106, a display unit 107, a user interface unit 108, a communication control unit 109, an audio decoding processing unit 110, and an audio output unit 111 are connected to the system bus 101. The system bus 101 transmits data between these blocks. The RAM 103 includes an output buffer and is used also as a data buffer in a media file generation process and as an output destination of data to be stored in a media file.

The image encoding/decoding processing unit 105 is a video codec for video and still images according to H.265 (HEVC), H.264 (AVC), AV1, JPEG, etc., and serves to perform coding and decoding on still and video data. The audio encoding/decoding processing unit 110 is an audio codec according to MP3, AAC, AC-3, FLAC, LPCM, WMA, etc., and executes the process of encoding and decoding audio data. The metadata processing unit 106 acquires data (encoded data) encoded by the image encoding/decoding processing unit 105 and data encoded by the audio encoding/decoding processing unit 110. The metadata processing unit 106 then generates a media file according to a predetermined file format (for example, HEIF). More specifically, the metadata processing unit 106 performs an analysis process on metadata stored in a media file containing a still image, a moving image, audio data, and the like and generates information on the still image, the moving image, and the audio data and acquires parameter information related to the encoded data. The metadata processing unit 106 then executes a process of storing these pieces of information as metadata in a file together with the encoded data. The encoded data to be acquired may be data stored in advance in the ROM 104 or data acquired via the communication control unit 109 and stored in the buffer of the RAM 103. In addition, the metadata processing unit 106 analyzes metadata stored in a file and processes metadata when a still image, a moving image, or audio data is played back.

The display unit 107 is intended to be a screen for displaying an application of the media file generation apparatus 100. An example of the display unit 107 is a liquid crystal display apparatus. The display unit 107 may include a screen touch sensor to allow a user to operate the application using a GUI (Graphic User Interface). The display unit 107 may be used to play back a file to check a generated file. The user interface unit 108 is an interface for receiving an operation (inputting) on the media file generation apparatus 100 performed by a user. The user interface unit 108 includes, for example, a physical operation interface such a button, a switch, and/or the like.

The communication control unit 109 is a network interface that connects to a network to transmit and receive a transmission frame. The communication control unit 109 is, for example, PHY and MAC (transmission media control process) of a wired LAN Ethernet (registered trademark). Alternatively, in a case where the media file generation apparatus 100 can connect to a wireless LAN, the communication control unit 109 includes a controller configured to execute wireless LAN control according to IEEE 802.11a/b/g/n/ac/ax, an RF circuit, and an antenna.

The audio output unit 111 is intended to be a processing unit that controls the media file generation apparatus 100 in terms of outputting to an audio output device such as a headphone or a speaker. Although the present embodiment described above does not include an input unit for inputting an image and audio, an input unit may be provided.

Media File Generation Process

Figure 2:
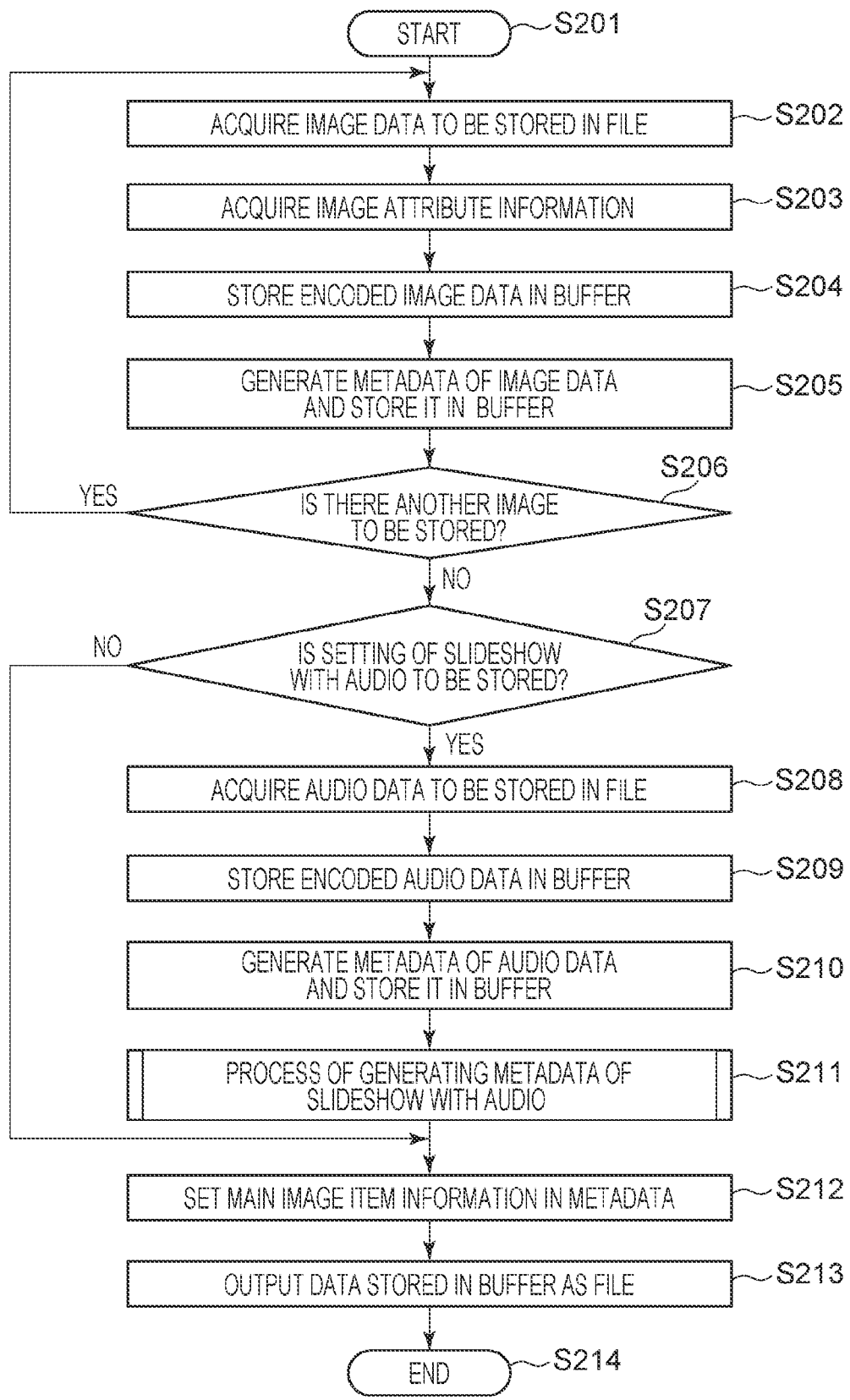
FIG. 2 is a flowchart illustrating a process performed by a media file generation apparatus to generate a slideshow with audio.
Figure 5:
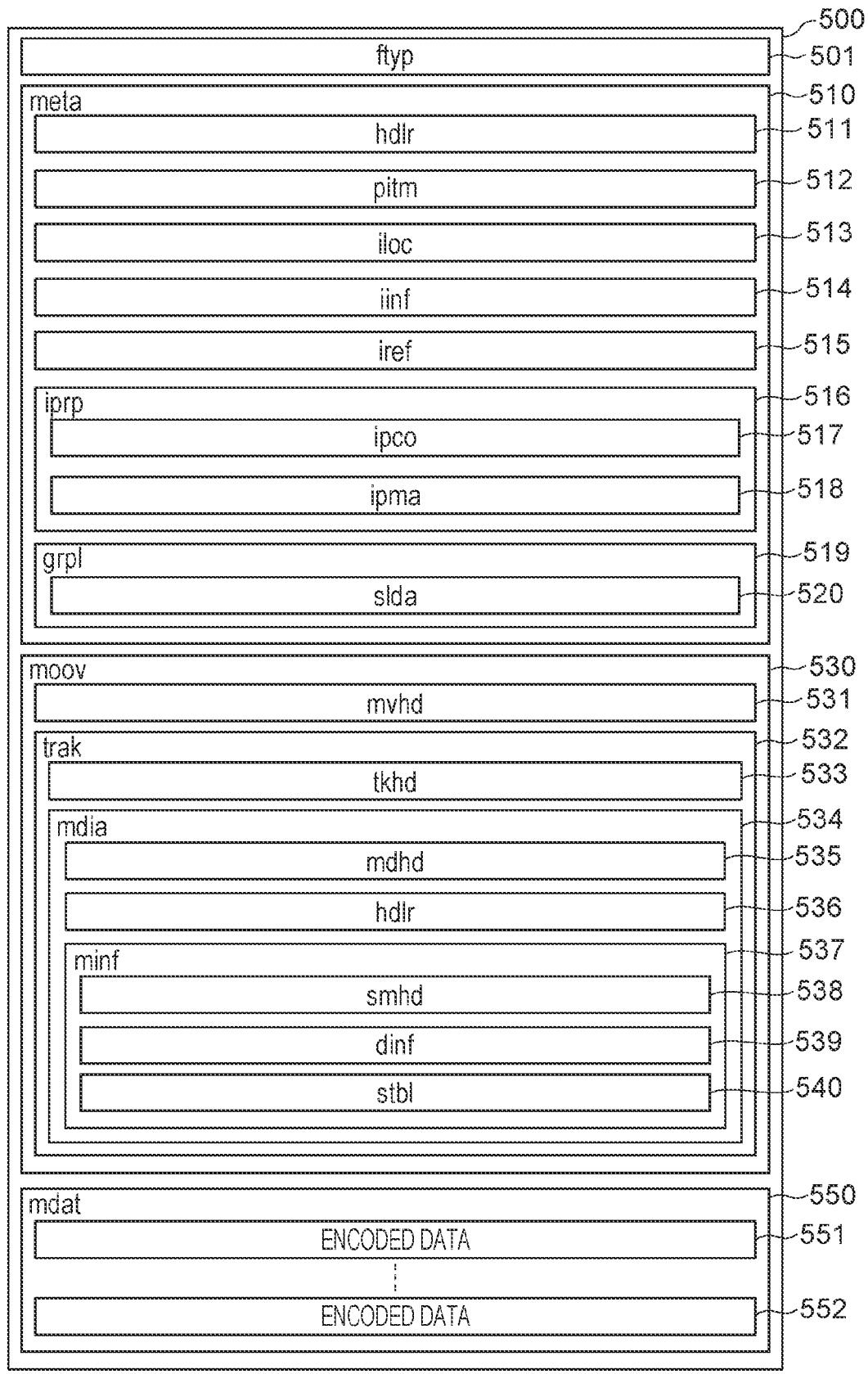
FIG. 5 is a diagram illustrating a structure of a generated HEIF file.

Next, a flow of a media file generation process performed by the media file generation apparatus 100 is described with reference to FIG. 2, FIG. 5, and FIG. 8. FIG. 2 is a flowchart illustrating the media file generation process. More specifically, FIG. 2 illustrates the processing flow of generating a file that contains one or more still images according to the HEIF file format. Each step in the flowchart in FIG. 2 represents a process executed by software by the CPU 102, the image encoding/decoding processing unit 105, the metadata processing unit 106, or the audio encoding/decoding processing unit 110. In the following description, the description of "CPU 102" means a software process executed by the CPU 102. FIG. 5 illustrates a structure of a HEIF file 500, which is an example of a HEIF file generated by the media file generation apparatus 100 according to the present embodiment. The HEIF file 500 has a metadata storage area 510, a metadata area 530, and an encoded data storage area 550. The metadata storage area 510 (MetaBox (meta)) is a metadata area related to untimed metadata (mainly still images). The metadata area 530 (MoovieBox (moov)) is a metadata area for metadata related to presentations such as moving images and audio data. The encoded data storage area 550 (MediaDataBox (mdat)) is a data area for storing data such as encoded data.

FIG. 8 illustrates an example of a HEIF file output according to the present embodiment. In this example shown in FIG. 8, the HEIF file stores one or more still images, one audio, and a group constituting a slideshow according to the HEIF file format.

The media file generation process starts from S201. First, in S202, the CPU 102 acquires (selects) image data to be stored in the HEIF file from the image data stored in the RAM 103 or the ROM 104. This acquisition process may be performed based on information set in advance for the media file generation apparatus 100 or based on an operation performed by a user via the user interface unit 108, or the like. The image data may be a HEIF file in which one still image is stored, or a file in which a still image according to another format such as JPEG is stored. The image data may be one piece of image data in a HEIF file in which a plurality of still images are stored. The image data may be unencoded RAW image data. Alternatively, the image data may be still image data which is not stored as a file. An image capture means may be separately provided, and the image data may be image data acquired by the image capture means. Next, in S203, the CPU 102 analyzes the image data acquired in S202 to acquire image attribute information. The image attribute information includes, for example, a width and a height of an image, the number of color components, a bit length, and/or the like. In S204, the image encoding/decoding processing unit 105 HEVC-encodes the image data and transfers the encoded data to the output buffer on the RAM 103 and stores it therein. In a case where the given image data is already HEVC-encoded, the encoded data may be directly transferred to the buffer, or may be re-encoded using a designated parameter.

Note that in the case where the given image data is already encoded according to other encoding method, the data may be transcoded to obtain HEVC encoded data. The encoded data is one of pieces of encoded data stored in the encoded data storage area 550. Hereinafter, the image data/encoded data stored (in the HEIF file) in S204 will also be collectively referred to as image data.

Next, in S205, a process is executed by the metadata processing unit 106 to generate metadata related to the image data to be stored in the HEIF file. The metadata processing unit 106 acquires a parameter set necessary for decoding the encoded data generated in S205. More specifically, the parameter set is a video parameter set (VPS), a sequence parameter set (SPS), a picture parameter set (PPS), or the like. The metadata generated in S205 includes image item information, image attribute information, and/or the like.

The image item information is entry data stored in an area 514 (ItemInfoBox (iinf)) shown in FIG. 5. The entry data in iinf sets an item ID (identification information) for identifying image data in the file and an item type indicating that the image data is an HEVC-encoded image.

On the other hand, the image attribute information is data stored in an area 516 (ItemPropertiesBox (iprp)) shown in FIG. 5. That is, the image attribute information includes entry data in an area 517 (ItemPropertyContainerBox (ipco)) and entry data in an area 518 (ItemPropertyAssociationBox (ipma)). The attribute information stored in ipco includes entry data indicating the acquired HEVC parameter set, entry data indicating the width and the height of the selected image, and/or the like. In ipma, entry data indicating association between the item ID and the entry data in ipco is generated. The data of image attribute information generated in S205 is stored in the output buffer on the RAM 103 as a part of the metadata stored in the metadata storage area 510 (MetaDataBox (meta)) shown in FIG. 5. In addition, a thumbnail image, a metadata structure such as EXIF, and/or the like of the acquired image are generated. In a case where the acquired image is a derived image or the like, entry data of iref indicating association between image data is generated and stored in area 515 (ItemReferenceBox (iref)). In the case of EXIF metadata or the like, item information is generated as a metadata item associated with the image item. In the case of a derived image, there is a possibility that the encoded data to be stored includes a plurality of sub-images. In that case, in addition to image item information and image attribute information related to the images representing the derived images, image item information and image attribute information are generated for each sub-image.

When the process proceeds from S205 to S206, the CPU 201 determines whether there is further image data which is to be stored in the HEIF file to be generated. In a case where there is further image data to be stored, the process returns to S202, but otherwise, the process proceeds to S207. When the process returns from S206 to S202, the CPU 201 acquires (selects) other image data and executes the processes from S203 to S209 as described above.

In S207, the CPU 102 determines whether or not to store setting of a slideshow with audio (in which images are displayed successively together with playback of audio) in the HEIF file being generated. This determination process may be performed based on information set in advance for the media file generation apparatus 100 or based on an operation performed by a user via the user interface unit 108, or the like. In a case where the setting for the slideshow with audio is to be stored in the HEIF file (YES in S207), the process proceeds to S208.

In S208, the CPU 102 acquires (selects) audio (sound/voice) data to be stored in the HEIF file from the audio (sound/voice) data stored in the RAM 103 or the ROM 104. This acquisition process may be performed based on information set in advance for the media file generation apparatus 100 or based on an operation performed by a user via the user interface unit 108, or the like. The audio data may be an audio file such as an MP3 file or an AAC file in which one piece of audio data is stored, or may be audio data stored in a video file such as an MP4 file. The audio data may be a file capable of storing other audio data, or may be one piece of audio data in a file in which a plurality of pieces of audio data are stored. The audio data may be audio (sound/voice) data which is not stored as a file. The audio data may be audio (sound/voice) data obtained by using audio input means such as a microphone.

In S209, the audio encoding/decoding processing unit 110 encodes the audio data and transfers the encoded data to the output buffer on the RAM 103 and store the encoded data therein. In a case where the given audio data is such audio data which has already been encoded, the given audio data may be directly transferred to the buffer. The encoded data is one of pieces of encoded data stored in the encoded data storage area 550. In the following description, the audio data/encoded data stored (in the HEIF file) in S209 will also be collectively referred to as audio data.

Next, in S210, a process is executed by the metadata processing unit 106 to generate metadata related to the audio (sound/voice) data to be stored in the HEIF file.

The metadata processing unit 106 generates an area 531 (MoovieHeaderBox (mvhd)) and an area 532 (TrackBox (trak)) to be stored in the area 530 (MoovieBox (moov)) in FIG. 5.

Next, an area 533 (TrackHeaderBox (tkhd)) and an area 534 (MediaBox (mdia)) to be stored in the area 532 (TrackBox (trak)) are generated.

Furthermore, MediaHeaderBox (mdhd), HandlerBox (hdlr), and MediaInformationBox (minf) to be stored in the area 534 (MediaBox (mdia)) are generated.

As shown in FIG. 8, the handler type of MediaBox (mdia) specified in hdlr may be 'soun'.

Next, an area 538, an area 539, and an area 540 to be stored in the area 537 (MediaInformationBox (minf)) are generated. Here, the area 538 is SoundMediaHeaderBox (smhd), the area 539 is DataInformationBox (dinf), and the area 540 is SampleTableBox (stbl).

Furthermore, in the area 540, SampleDescriptionBox (stsd), SampleSizeBox (stsz), TimeToSampleBox (stts), and SampleToChunkBox (stsc), which are not shown, are stored.

The metadata related to the audio data generated in S210 is stored in the output buffer on the RAM 103 as a part of the metadata stored in the metadata area 530 related to the presentation of the moving image, the audio data, etc. in FIG. 5.

Next, in S211, a process is executed to generate metadata for a slideshow with audio. The process in S211 will be described later.

In S212, the metadata processing unit 106 determines a representative image from among the images stored in the HEIF file, and generates metadata of main image item information (sets the main image item information in the metadata). This representative image determination process may be performed based on information set in advance for the media file generation apparatus 100 or based on an operation performed by a user via the user interface unit 108, or the like. The metadata generated in S212 is stored in the area 512 (PrimaryItemBox (pitm)) in FIG. 5. The data format of pitm simply specifies the item ID of the representative image. The metadata generated in S212 is stored in the output buffer on RAM 103.

The final process in S213 is executed by the metadata processing unit 106. In S213, the metadata processing unit 106 generates data to be stored in the area 501 (FileTypeBox (ftyp)) and the area 511 (HandlerBox (hdlr)) in FIG. 5. As shown in FIG. 8, the handler type of MetaDataBox (meta) specified in hdlr may be 'pict'.

The metadata processing unit 106 then combines the generated ftyp and hdlr metadata, and the metadata to be stored in the metadata storage area 510, and the encoded data to be stored in the encoded data storage area 550, which are saved in the RAM 103.

Furthermore, ItemLocationBox (iloc) shLoown in an area 513 is generated as metadata for identifying the position of the encoded data.

Also in the case where audio data is stored (YES in S207), ChunkOffsetBox (stco) (not shown) is generated in the area 540 as metadata for identifying the position of the encoded audio data, and offset information is stored.

The metadata processing unit 106 then forms data having a structure such as that shown in FIG. 5 on the RAM 103 and outputs the resultant data as an HEIF file. After that, the process proceeds to S214 and the present processing flow ends (S214). The generated data of the HEIF file may be written by the CPU 102 from the RAM 103 into the ROM 104 and stored therein.

Note that in a case where the process of storing the setting for the slideshow with audio in S208 to S211 is skipped (NO in S207), the area 530 (MoovieBox (moov)) in FIG. 5 is not generated. Therefore, there is a possibility that various types of metadata in the areas 531 to 540 in the area 530 are not generated and are not included in the metadata of the HEIF file.

However, the area 530 (MoovieBox (moov)) is generated, for example, when an image sequence for purposes other than a slideshow is stored, or when related audio data is stored. Then, moov can be included in the metadata of the finally generated HEIF file.

In the above-described flow according to the present embodiment, the focus is on the determination of whether the setting for the slideshow with audio is to be stored or not. However, the flow may be for storing setting for a slideshow without audio. The flow may include a process for setting various types of metadata to be stored in HEIF. For example, the flow may be for generating a HEIF file including only a setting of associating a still image and audio, or the flow may take into account various types of metadata that can be specified by HEIF, such as a process for grouping and storing bracketed images.

An example of storing values (data) in the internal structure of the HEIF file according to the flow described above is described with reference to FIG. 8. FIG. 8 is a diagram illustrating an example of a HEIF file output according to the present embodiment. As item_ID, 2049 is stored in PrimaryItemBox (pitm) (corresponding to the area 512) shown in a description 801 in FIG. 8. Note that the PrimaryItemBox may be extended so as to specify a group ID of a group that identifies a slideshow with audio, as an ID designated in this Box. More specifically, a group ID for identifying SlideshowWithAudioEntityToGroup (slda) (corresponding to the area 520), which will be described later, is specified. In this case, 1001, which is a group id described later, is specified as the ID. ItemInfoBox (corresponding to the area 514) described in a description 802 makes each image item identifiable by item_ID and indicates the type of the image item identified by item_ID. It is described here that the image item whose item_ID is 2001 has a type of 'hvc1', that is, this image item is an HEVC-encoded image. Similarly, all image items with up to item_ID 2048 and an image item with item_ID 2050 are stored as HEVC-encoded images. An image item with item_ID 2049 has a type 'grid', which indicates that this image item is a grid-derived image item. The grid-derived image item refers to an image item in which a plurality of image items are combined into a single image item. For configuration information, ItemReferenceBox (corresponding to the area 515) and ItemDataBox, which will be described later, are referred to. ItemLocationBox (iloc) (corresponding to the area 513) described in a description 803 indicates the storage location, in the file, of each image data bitstream. An image item with an item_ID of 2049 has a construction_method of 1, which indicates that data exists in ItemDataBox (idat) described in a description 807. Also for other images, it is possible to identify their data locations in MediaDataBox (corresponding to the encoded data storage area 550) described in a description 810. ItemReferenceBox (iref) (corresponding to the area 515) described in a description 804 is an area for indicating the reference relationship between image items. Here, reference_type 'dimg' indicates image idem IDs pointing to a plurality of images constituting a grid-derived image item with item_ID 2049. Furthermore, it is described that in the derived image of reference_type 'dimg', image items with item_ID 2045 to item_ID 2048 are referred to from the derived image item with item_ID 2049. Next, reference type 'thmb' indicates thumbnail images, that is, it is indicated that an image item with item_ID 2050 is a thumbnail image with item_ID 2049.

In ItemPropertyContainerBox (ipco) (corresponding to the area 517) in ItemPropertiesBox (iprp) (corresponding to the area 516) described in a description 805, ItemProperty indicating image attribute information is stored, where hvcC indicates an HEVC encoding parameter, and ispe is attribute information indicating an image size. A description 806 describes ItemPropertyAssociationBox (ipma) (corresponding to the area 518) indicating an association between each image item and attribute information. Image items are associated one by one with attribute information in ipco. For example, item_ID 2001 and item_ID 2049 are associated with common ispe, which indicates that they have a common image size. On the other hand, item_ID 2050 is associated with different 'ispe', which indicates that it has a different image size.

A description 808 describes SlideshowWithAudioEntityToGroupBox(slda) (corresponding to the area 520) in which 1001 is specified as group id, and 46 is specified as the number of entries of a group. A first specified entity id of 1 indicates a track ID of an audio track which will be described later, and subsequently specified entity id's indicate item IDs 2001 to 2044 and 2049 of respective images in the order in which images are displayed in slideshow. That is, information is stored for playing back and displaying the slideshow with audio.

A description 809 of MovieBox (moov) (corresponding to the area 530) stores MoovieHeaderBox (mvhd) (corresponding to the area 531) and TrackBox (trak) (corresponding to the area 532), in which information on an audio presentation is stored in the Box structure. TrackBox further stores TrackHeaderBox (tkhd) (corresponding to the area 533) and MediaBox (mdia) (corresponding to the area 534). In TrackHeaderBox, flags indicate 3, which indicates that this track contains audio data. TrackID of 1 indicates an ID for identifying an audio track, which is an ID value indicated in above-described entity id of SlideshowWithAudioEntityToGroupBox.

Furthermore, MediaBox (mdia) stores MediaHeaderBox (mdhd), HandlerBox (hdlr), and MediaInformationBox (minf). MoovieHeaderBox, TrackHeaderBox, and MediaHeaderBox store information on a generation time, an edit time, a timescale, and a duration.

HandlerBox (hdlr) specifies 'soun' as hdlrType for identifying an audio track. Because of the audio track, MediaInformationBox (minf) stores SoundMediaHeaderBox (smhd) (corresponding to area 538). DataInformationBox (dinf) (corresponding to the area 539) stores information indicating the storage location of encoded audio data. Although not shown in detail, SampleTableBox (stbl) (corresponding to the area 540) stores information on each audio sample. More specifically, information on audio encoding and/or the like is stored using SampleDescriptionBox (stsd). Information indicating the size of each sample is stored in SampleSizeBox (stsz). In addition, information related to audio samples is stored using TimeToSampleBox (stts), SampleToChunkBox (stsc), and ChunkOffsetBox (stco).

In the present embodiment, as described above, audio and images for playing back and displaying a slideshow with audio are grouped together, and attribute information on each image is applied to the image when the slideshow is displayed. However, different methods may be employed as long as the audio and images are grouped, and the associated attributes are stored as properties or parameters of the group.

Slideshow Metadata Generation Process

Figure 3:
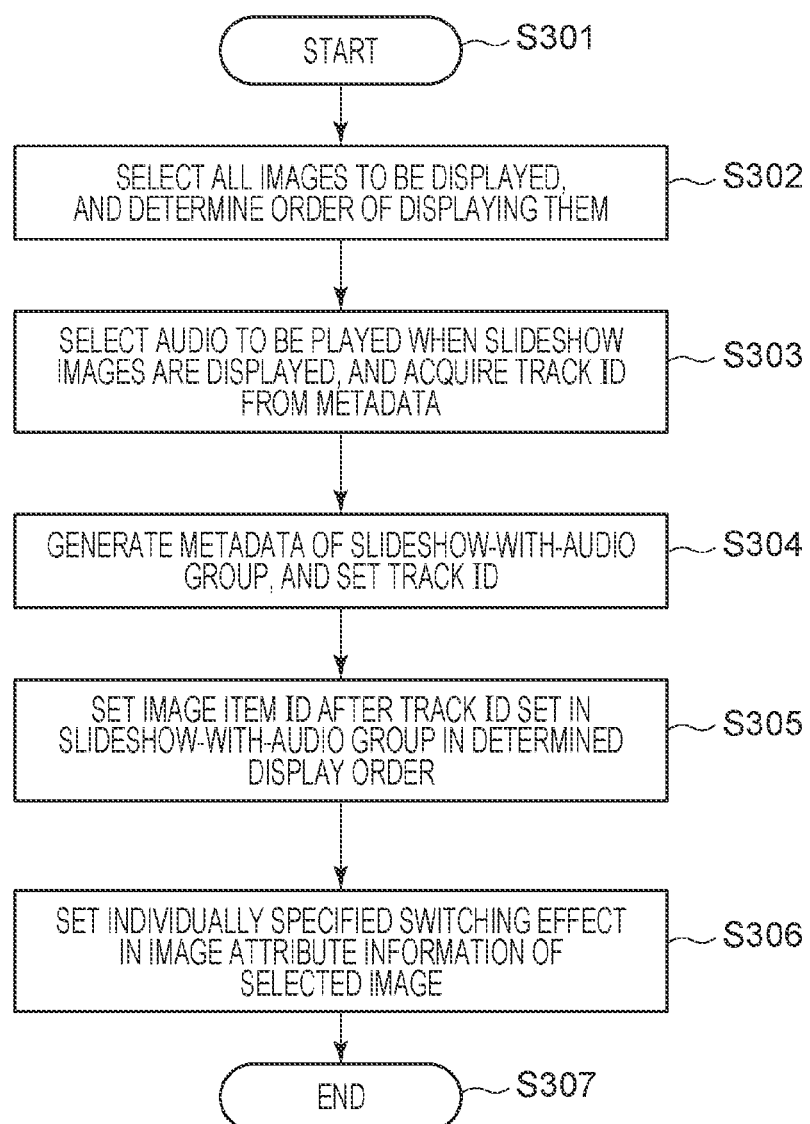
FIG. 3 is a flowchart illustrating a process performed by a media file generation apparatus to generate metadata of a slideshow with audio according to a first embodiment.

Next, the slideshow metadata generation process in S211 in FIG. 2 is described with reference to FIG. 3, FIG. 5, FIG. 6, FIG. 7, FIG. 8, FIG. 9, FIG. 10, and FIG. 11. In the present embodiment, audio and images constituting a slideshow with audio are stored as a group (SlideshowWithAudioEntityToGroup) in a HEIF file. FIG. 3 illustrates a flowchart of the metadata generation process according to the present embodiment. This process starts from S301. First, in S302, the CPU 102 selects one or more pieces of image data to be displayed in the slideshow from image data to be stored in a HEIF file, and determines the display order thereof. In the present embodiment, information on the display time (period) of the images to be displayed in the slideshow stored in the HEIF file is not specified. That is, no values are specified when the file is generated, and arbitrary values are determined when the file is played back. However, the display time may be determined and stored in the file. Next, in S303, the CPU 102 selects audio data to be played back when the slideshow is performed, and acquires an audio track ID from the metadata. The selection process in S302 and S303 may be performed based on information set in advance in the media file generation apparatus 100 or based on an operation performed by a user via the user interface unit 108, or the like.

Next, in S304, the metadata processing unit 106 defines a group of playback images and audio for the slideshow with audio. More specifically, the metadata processing unit 106 generates information (group information) for grouping images and audio to be displayed and played back in the slideshow. This group information is stored as metadata in the area 519 (GroupsListBox (grpl)) shown in FIG. 5. In HEIF, group information on items such as image data and a track is stored in grpl. A group ID serving as group identification information and a group type are assigned to the group information thereby identifying the group in the HEIF file. In the present embodiment, in S304, the metadata processing unit 106 generates slideshow-with-audio group information (SlideshowWithAudioEntityToGroupBox) as group information. FIG. 6 shows a data format of SlideshowWithAudioEntityToGroupBox. FIG. 7 shows a data format of EntityToGroupBox from which SlideshowWithAudioEntityToGroupBox is derived.

The metadata processing unit 106 generates data in the data format shown in FIG. 6 and stores it in grpl (see the area 520 shown in FIG. 5). This SlideshowWithAudioEntityToGroupBox is a box for identifying a group of entities for the purpose of displaying a slideshow including a set of plurality of images with audio. The group type of this SlideshowWithAudioEntityToGroupBox is 'slda' as described in a description 601, which indicates a group of tracks and items used for the slideshow with audio.

The data format shown in FIG. 6 is an extension from EntityToGroupBox. Therefore, group id in a description 701 and num_entries_in_group in a description 702 shown in FIG. 7 are specified separately. Here, group_id indicates a group ID, and num_entries_in_group indicates the number of tracks and items included in the group.

In a description 703, entity_id indicates a track ID or an item_ID, wherein first specified entity_id indicates a track ID of an audio track. In S304, a track ID of a selected audio is set in the first entity_id.

Thereafter, in S305, item IDs of selected images to be displayed in the slideshow are specified in the subsequent entity_id in the display order. In the present embodiment, SlideshowWithAudioEntityToGroupBox is defined separately to store the slideshow group with audio.

However, as shown in FIG. 11, a slid entity group defined in ISO/IEC23008-12:2017 CDMA3 may be extended and used.

For example, flags may be described in a description 1101 to identify whether a slideshow group of interest is a group of slideshow with audio or a slideshow without audio. More specifically, a slideshow with_audio is defined (for example, by setting a value to 1), and when flags&with_audio is positive (true), a slideshow-with-audio group is indicated. On the other hand, in a case where flags&with_audio is negative (false), a slideshow-without-audio group is indicated. That is, when flags&with_audio is positive (true), the first entity_id indicates only an audio track ID.

In this method, not only SlideshowEntityToGroupBox but also EntityToGroup of other grouping type can be associated with image items and an audio track using an iaug group.

Next, in S306, individually specified switching effects are set in the image attribute information of the selected images, and then in S307 the process is ended. Note that the slideshow-with-audio group stored in the HEIF file does not include information related the time (period) at which the stored images are to be reproduced and displayed. This allows an application to determine the display time of the images in the slideshow and to reproduce the images according to the determined time. In this case, since the audio track stored in the HEIF file is presentation information associated with time information, there is a possibility that the playback of the audio track may end earlier. To handle the above situation, the flags shown in the description 602 are used to indicate information specifying the behavior to be performed when the playback of the audio track data ends in the middle of the playback of the slideshow. More specifically, audio_play_loop is defined (for example, as having a value of 2), and when flags&audio_play_loop is positive (true), the audio track is played repeatedly. On the other hand, when flags&audio_play_loop is negative (false), it is specified that even if the displaying of the slideshow continues after the playback of the audio track has been completely ended, no further audio playback is performed. Note that ISOBMFF defines EditListBox (elst) in EditBox (edts) in TrackBox (trak). This Box has a Box structure to indicate mapping between the presentation time and the media time. Similarly, flags are also defined in this box to specify whether or not to play the edit list repeatedly. That is, it is possible to specify whether the audio track is to be repeated. On the other hand, by using the flags provided in iaugEntityToGroupBox described above, it is possible to set whether or not to repeat the playback of the audio track. Thus, even when the same audio track is specified for a plurality of iaug groups, it is possible to specify whether or not to repeat the audio track for each individual group. In this case, it is preferable that the repetition setting specified using EditListBox is ignored (overwritten) and only the flags setting specified in iaugEntityToGroupBox is effective. On the other hand, the operation may be performed taking into account both flags settings. More specifically, in a case where either one of settings specifies repeating, the audio track is repeatedly played back as long as the images specified in the group continue to be displayed. Alternatively, only in a case where both flags settings specify repeating, playback of the audio track is repeated.

Still alternatively, the total time for the slideshow playback may be determined from the information on the audio track specified in advance, and the images may be displayed for the time period obtained by dividing the total time by the specified number of images. More specifically, the total playback time of the slideshow is determined from Duration specified in TrackHeaderBox and the value specified in TimeScale. Then, the application performs control such that the images of the slideshow are displayed until the audio track is completely played back once or a plurality of times. That is, the slideshow display time per image may be given by a time obtained by dividing the playback time specified in TrackHeaderBox by a value equal to num_entities_in_group specified in the slideshow group minus 1. Note that the above-described operation may be defined as default without using the flags. For example, when a slideshow is displayed for a period longer than the duration specified in the audio track duration, the audio track is repeatedly played back as long as the slideshow display is continued. On the other hand, the playback of the audio track may be continued even after the display of the images specified in the slideshow group is finished. More specifically, audio_play_completely is defined (for example, as having a value of 4) in the same way as the flags for audio repetition setting. In a case where flags&audio_play_completely is positive (true), the playback of audio is continued even after the displaying of images in the slideshow is ended. When flags&audio_play_completely is negative (false), the playback of the audio track is terminated when the displaying of images in the slideshow ends even if the playback of the audio track is in progress.

Since SlideshowWithAudioEntityToGroupBox is an extension of EntityToGroupBox, tracks are allowed to be stored as a group without limitation. However, in the present embodiment, the track id is limited only to the first entity_id, and subsequent entity_id's are limited to image items only. As a result, even in a case where the track ID and the item ID cannot be uniquely identified, the track ID and the item ID can be identified by the storage location specified by the entity id. Even when the track ID and the item ID can be uniquely identified, by limiting the first ID to the track ID in advance, it is possible to limit the ID search range within which ID search is performed in the playback process, which makes it possible to improve the processing efficiency. However, alternatively, the track ID may be included at an arbitrary location. For example, after the track ID is specified, playback of the audio track may be started such that when the subsequent item IDs are displayed as a slideshow thereby achieving the playback of the slideshow with audio. In this case, it is necessary to uniquely identify the item Ids and the track ID, and thus it is required that the item Ids, the track ID, and the group ID can be uniquely identified. For example, if metaBox is stored in the top level of the file (not in metaBox in moovBox) and SlideshowWithAudioEntityToGroupBox is stored therein, it is possible to uniquely identify the above-described IDs. Similarly, if the unif brand definition defined by ISOBMFF is a file specified in FileTypeBox (ftyp) (corresponding to area 501), the unique identifiability can be guaranteed. Alternatively, a method of defining audio data as an item and specifying it by entity_id may be used. In this case, it is necessary to further perform a process to make a definition of the association between the audio item and the actual audio data and store the definition.

In the present embodiment, the type of slideshow group with audio is defined, and the slideshow group is extended such that an audio track ID can be stored. Note that it is possible to make a similar extension such that it is possible to add audio playback not only to a slideshow but also to other entity groups. For example, a type of an entity-with-audio group is defined for a panorama entity group, a stereo entity group, or the like. By setting entity_id at a specific storage location as an audio track, it is possible to associate the audio.

The iaug entity group defined in ISO/IEC23008-12:2017 FDAM2 may be extended to store a slideshow-with-audio group. More specifically, data is stored in a slid entity group defined in ISO/IEC23008-12:2017 CDAM3 and in an extended iaug entity group. An example of storing values (data) related to a slideshow-with-audio group according to the present embodiment is described below with reference to FIG. 10. FIG. 10 is a diagram illustrating an example of a HEIF file output according to the present embodiment. FileTypeBox (ftyp) described in a description 1001 in FIG. 10 stores a unif brand in which an idem ID, a track ID, and a group ID are uniquely defined. Furthermore, 2001 is stored as item_ID in PrimaryItemBox (pitm) in a description 1002. Note that PrimaryItemBox may be extended to specify a group ID of a group which identifies a slideshow with audio, by specifying an ID in the Box. More specifically, a group ID is specified to identify iaugEntityToGroupBox (iaug) or a group ID to identify SlideshowEntityToGroupBox (slid), which will be further described later. In this case, 1002 or 1001 is specified as an ID in group id, which will be described later. ItemInfoBox described in a description 1003 allows each image item to be identified by item_ID which indicates what kind of image item identified by item_ID is. It is described here that the image item whose item_ID is 2001 has a type of 'hvc1', which indicates that this image item is an HEVC-encoded image. Similarly, all image items with up to item_ID 2048 are stored as HEVC-encoded images. ItemLocationBox (iloc) described in a description 1004 indicates the storage location, in the file, of each image data bitstream. For each image data bitstream, it is possible to identify the location of data in MediaDataBox described in a description 1010. In ItemPropertyContainerBox (ipco) in ItemPropertiesBox (iprp) described in a description 1005, ItemProperty indicating image attribute information is stored, where hvcC indicates an HEVC encoding parameter, and ispe is attribute information indicating an image size. Furthermore, wipe indicates an effect of switching a display between images in the slideshow. A description 1006 describes ItemPropertyAssociationBox (ipma) indicating the association between each image item and attribute information. Image items are associated one by one with attribute information in ipco. For example, item_ID 2001 to item_ID 2048 are associated with common ispe, which indicates that the image items have a common image size. Furthermore, item_ID 2001 specifies wipe as an image switching effect. This indicates that when an image of item_ID 2001 is switched to another image, the effect of wipe is applied to switching the display. A description 1007 describes SlideshowEntityToGroupBox(slid). 1001 is specified as group id, and 48 is specified as the number of entries of the group. Here, item IDs from 2001 to 2048 of the images are specified as entity_id in the order in which the images are to be displayed in the slideshow. A description 1008 describes iaugEntityToGroupBox(iaug). 1002 is specified as group_id, and 2 is specified as the number of entries of the group. 1 is stored in entity id indicating an audio track ID, and a group ID 1001 indicating a slideshow group is stored. In an iaug entity group defined in ISO/IEC23008-12:2017 FDAM2, 2 is specified as num_entities_in_group one of which indicates an image item, and the other indicates an audio track. On the other hand, in the present embodiment, a part for specifying image items is extended to allow group IDs of other EntityToGroupBox to be specified. This makes it possible to specify a group ID of SlideshowEntityToGroupBox as entity_id of an iaug group. Thus, it becomes possible to play back audio data when a slideshow stored in SlideshowEntityToGroupBox is displayed. That is, information for displaying and playing the slideshow with audio is stored.

A description 1009 describes MovieBox (moov) and has the same configuration as that of the description 809 shown in FIG. 8. Another form of storing a group of slideshow with audio is described below, which extends the iaug entity group defined in ISO/IEC 23008-12:2017 FDAM2. An example of storing values (data) related to a group of slideshow with audio according to the present embodiment is described below with reference to FIG. 17. In the example shown in FIG. 10 in which a value (data) related to a group of slideshow with audio, a group ID of the group of images associated with audio is specified in iaugEntityToGroupBox. On the other hand, in the example shown in FIG. 17, audio tracks to be associated are also grouped using EntityToGroupBox, and a group ID of audio entity_id in iaugEntityToGroupBox can be specified. Descriptions 1701 to 1707 in FIG. 17 are the same as the descriptions 1001 to 1007 in FIG. 10. A description 1708 describes iaugEntityToGroupBox(iaug). 1002 is specified as group_id, and 2 is specified as the number of entries of the group. 1003 is stored in entity_id to indicate a group ID of altEntityToGroupBox, which indicates an alternative audio track described below, and a group ID 1001 indicating a slideshow group is stored. In an iaug entity group defined in ISO/IEC23008-12:2017 FDAM2, 2 is specified as num_entities_in_group one of which indicates an image item and the other indicates an audio track. On the other hand, in the present embodiment, a part for specifying image items is extended such that group IDs of other EntityToGroupBox can be specified. Furthermore, the part for specifying audio tracks is also extended to allow the group ID of other EntityToGroupBox to be specified. This makes it possible to specify a group ID of SlideshowEntityToGroupBox as entity_id of an iaug group. Furthermore, a group ID of altrEntityToGroupBox including a plurality of audio tracks can be specified in entity_id of an iaug group. A description 1709 describes altrEntityToGroupBox(altr), where 1003 is specified as group id, and 2 is specified as the number of entries of the group, and 1 and 2 are specified as entity_id wherein 1 is the ID of an audio track described in a description 1710 and 2 is the ID of an audio track described in a description 1711. Furthermore, ID of alternative entity_id is specified in altrEntityToGroupBox, such that in playback, it is allowed to select either one of them according to the needs of the application. In a case where a group ID of EntityToGroupBox is specified in entity id for audio in iaugEntityToGroupBox, it is desirable that an audio track ID is specified for each of all entity_id's specified for the group.

Note that the grouping of audio tracks is not limited to group type altr, but it is also allowed to define and specify a group type indicating an audio playlist as with a slideshow. This makes it possible to use iaugEntityToGroupBox as information that associates audio and images. That is, any of combinations of an audio track and an image group, an audio group and an image, an audio group and an image group is allowed. In an iaug entity group defined in ISO/IEC23008-12:2017 FDAM2, it is allowed to specify only audio track IDs and image item IDs. In a case where an audio track ID specified here is also specified as entity_id of altrEntityToGroupBox specified as a different group, it is stipulated that one of them is selected and played as audio. The present embodiment makes it possible to directly specify an altr group ID, which results in a simplification in the playback processing. That is, according to previous techniques, it is necessary to first parse whether an audio track ID specified in iaugEntityToGroupBox is specified in another altr group, and then determine an audio to play, but according to the present embodiment, it is possible to specify the group ID directly. This makes it possible to determine whether or not there is an alternative audio track at a point of time when iaugEntityToGroupBox is parsed.

As a result, when a slideshow stored in SlideshowEntityToGroupBox is displayed, audio data specified in an audio group can be played by an audio playback method according to the specified group. That is, information for displaying and playing the slideshow with audio is stored.

Note that it is also possible to store a plurality of pieces of iaugEntityToGroupBox in one file. Therefore, in a case where the same audio track ID is specified for a plurality of pieces of iaugEntityToGroupBox, it is assumed that the audio data is played from the beginning for each group. On the other hand, in a case where an audio track specified in iaugEntityToGroupBox is in the middle of playback when an image group or an image displayed is switched, the image displayed may be switched while playing the audio track. Even if an image item and an audio track are associated to each other in an individual piece of iaugEntityToGroupBox, the individually associated audio track information is ignored when an image group is generated. In the present embodiment, a group ID of another EntityToGroupBox can be specified as entity_id specified in iaugEntityToGroupBox. However, as the group ID to be specified, it is not allowed to specify a group ID of iaugEntityToGroupBox. In other words, it is necessary to avoid a nested loop.

Next, a metadata generation process according to the present embodiment is described with reference to FIG. 9. FIG. 9 illustrates a flowchart of a process of generating metadata of a slideshow according to the present embodiment. In FIG. 9, the process of generating the metadata of the slideshow starts from S901. First, in S902, the CPU 102 selects images to be displayed in the slideshow and determines the order of displaying them. In the present embodiment, parameters related to the display time are not stored because it is assumed that the display time (period) is determined by the playback apparatus. That is, when a file is played back, the application specifies an arbitrary time (period) in the playback process. Next, in S903, the metadata processing unit 106 generates metadata of SlideshowEntityToGroupBox, and sets a group of display images for the slideshow. More specifically, the metadata processing unit 106 generates information (group information) for grouping images to be displayed in the slideshow. This group information is metadata described in the description 1007 in FIG. 10 stored in GroupsListBox (grpl). In HEIF, group information on items such as image data is stored in grpl. A group ID serving as group identification information and a group type are assigned to the group information thereby identifying the group in the HEIF file. In the preset embodiment, in S903, the metadata processing unit 106 generates slideshow group information (SlideshowEntityToGroupBox) as group information. FIG. 11 illustrates a data format of SlideshowEntityToGroupBox. The metadata processing unit 106 generates data according to the data format shown in FIG. 11 and stores it in grpl. This SlideshowEntityToGroupBox is Box for identifying a group of entities for the purpose of displaying a set of plurality of images in a slideshow. The group type of this SlideshowWithAudioEntityToGroupBox is 'slid', indicating a group of items used in the slideshow with audio. The data format shown in FIG. 11 is an extension from EntityToGroupBox. Therefore, group_id storing the group ID and num_entries_in_group indicating the number of items included in the group are specified separately. The item IDs of selected images to be displayed in the slideshow are specified in the order in which the images are to be displayed.

Next, in S904, an audio track is selected which is to be played when the images are displayed in the slideshow, and an audio track ID is acquired from the metadata. In a case where the audio tracks are grouped separately, a plurality of audio track IDs are acquired and grouped together, and then a group ID is acquired. The selection process in S902 and S904 may be performed based on information set in advance in the media file generation apparatus 100 or based on an operation performed by a user via the user interface unit 108, or the like.

Next, in S905, the metadata processing unit 106 generates metadata for configuring the slideshow with audio. More specifically, the metadata processing unit 106 generates an iaug entity group as group information. This group information is metadata described in the description 1008 in FIG. 10 stored in GroupsListBox (grpl). A group ID serving as group identification information and a group type are assigned to the group information thereby identifying the group in the HEIF file. In the present embodiment, in S905, the metadata processing unit 106 generates an iaug entity group as group information. This iaugEntityToGroupBox is Box for identifying a group of entities for the purpose of associating one audio track with an image item or entity group. The group type of this iaugEntityToGroupBox is 'iaug', which indicates that this is a group of audio and items or groups.

Next, in S906, individually specified switching effects are set in the image attribute information of the images selected and stored in SlideshowEntityToGroupBox, and the process is ended in S907. As described above, in the present embodiment, an audio track ID is allowed to be specified in one of entity_id stored in the iaug entity group, and an image item ID or a group ID of an entity group is allowed to be specified in the other one of entity id. According to the present embodiment, it is allowed not only to associate an audio track with a slideshow group, but it is also allowed to associate an entity group and an audio track in other entity groups (for example, a panorama entity group, a burst entity group, etc.). In the present embodiment, a flag may be added to an iaug entity group to specify whether a player should repeat the playback of the audio when the image is displayed for a period longer than the duration of the audio track. Note that the operation may be defined as a default operation without using the flag. For example, when a slideshow is displayed for a period longer than the duration specified in the audio track duration, the audio track is repeatedly played back as long as the slideshow display is continued.

In a case where an item ID stored in SlideshowEntityToGroupBox is associated with an audio track, it is allowed to associate the audio track with the entire group. That is, this is the case when an image item and an audio track are associated in an iaug entity group, the item ID thereof is stored in SlideshowEntityToGroupBox. In this case, the audio track specified in the iaug entity group is applied not only to the associated image item, but this audio track is applied to the entire group such that the audio track is played when the slideshow of the group of SlideshowEntity including this image item is played. In a case where there are a plurality of such iaug groups, one of the plurality of iaug groups may be selected, or playback of an audio track may be started when an item ID is started, and the audio track may be switched when an image item associated with a next audio track is played. In this case, an image item associated with an audio track is displayed for the first time, the audio tack may be started to be played, or the audio track may be started to be played when the slideshow is started. Alternatively, a slideshow with audio may be played only in a case where an item ID specified in PrimaryItemBox is an iaug group and is stored in SlideshowEntityToGroupBox. Alternatively, SlideshowEntityToGroupBox may be extended such that a first entity_id is used for specifying an ID of an audio track, and to associate an audio track, an audio track ID thereof is specified in the first entity_id. In a case where an audio track is not associated, a value such as 0 that is not used in the file may be specified in the first entity id to indicate that a slideshow group of interest does not include audio.

Slideshow Playback Process

Figure 4:
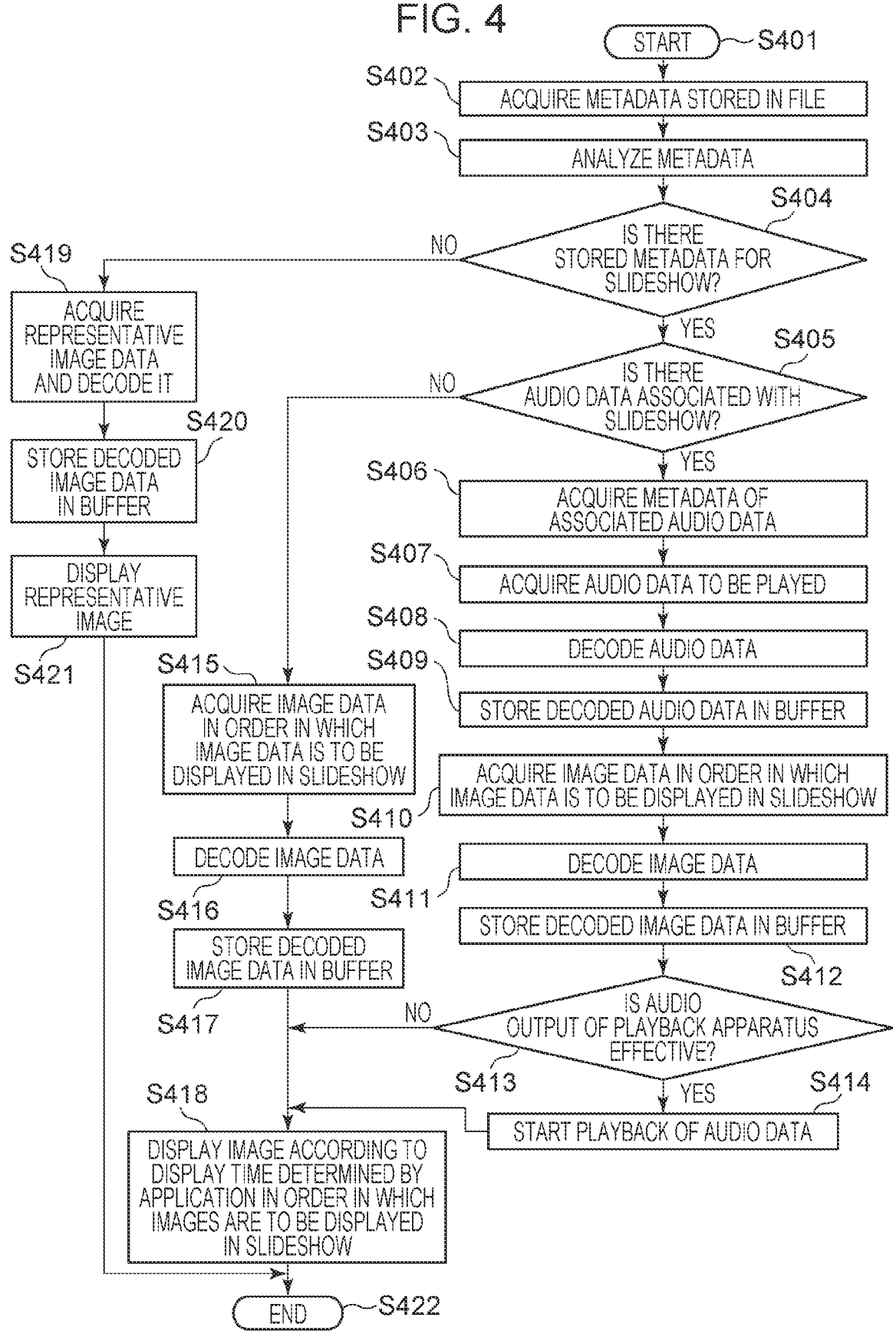
FIG. 4 is a flowchart illustrating a process performed by a media file generation apparatus to play back a slideshow with audio according to the first embodiment.

Next, a process of playing a slideshow stored in a media file is described with reference to FIG. 4. FIG. 4 is a flowchart illustrating a process of playing a slideshow in a media file. More specifically, FIG. 4 illustrates a processing flow of playing a file in which one or more still images are stored according to the HEIF file format. Each step in the flowchart in FIG. 4 represents a process executed by software by the CPU 102, the image encoding/decoding processing unit 105, the metadata processing unit 106, or the audio encoding/decoding processing unit 110. In the following description, the description of "CPU 102" means a software process executed by the CPU 102.

The playback process of the slideshow described in the media file starts from S401. First, in S402, the CPU 102 acquires metadata stored in the metadata storage area 510 (MetaBox (meta)) from the HEIF file stored on the RAM 103 or the ROM 104. Next, in S403, the CPU 102 analyzes the metadata acquired in S402. In S404, the CPU 102 determines, based on the analysis result, whether or not metadata related to a slideshow is stored in the meta data. In a case where the metadata related to a slideshow is stored in the metadata (YES in S404), the process proceeds to S405, but otherwise (NO in S404), the process proceeds to S419. In a case where the process proceeds to S419, the media file generation apparatus 100 executes a process to play back a representative image stored in the HEIF file. In S419 and S420, the encoded data of the image specified as the representative image is acquired and decoded, and the resultant image data is stored in the buffer. In S421, the representative image is displayed, and the process is ended in S422.

In S405, it is further determined whether audio is associated with the metadata related to the slideshow. In a case where audio is associated with the metadata of the slideshow (YES in S405), the process proceeds to S406, but otherwise (NO in S405), the process proceeds to S415. In a case where the process proceeds to S415, the media file generation apparatus 100 executes a process to play back the slideshow with no audio stored in the HEIF file. In S415, the image encoding/decoding processing unit 105 acquires image data in the order in which images are to be displayed in the slideshow. The image data is acquired by specifying the location in the encoded data storage area 550 (MediaData-Box (mdat)) based on the location information indicating the location in the media file stored in the metadata. In S416, the image encoding/decoding processing unit 105 decodes the image data to be displayed, and temporarily stores the decoded image data in the buffer in S417. Subsequently, in S418, the CPU 102 displays the image on the display unit 107 according to the attribute information described in the metadata and the display time determined by the application. The processes in S415 to S418 are executed repeatedly to sequentially display the images stored in the HEIF file on the display unit 107. Although not shown in the present embodiment, when all the images stored as the slideshow have been displayed, the CPU 102 may control the display unit 107 to repeat displaying from the first image or to end the displaying of slideshow display.

In step S406, the CPU 102 acquires metadata of audio associated with metadata of the slideshow from the HEIF file stored on the RAM 103 or the ROM 104. More specifically, the metadata on the audio track is acquired from the metadata stored in the storage area 530 (MoovieBox (moov)). In S407, the CPU 102 analyzes the metadata acquired in S406, and the audio encoding/decoding processing unit 110 acquires encoded audio data to be played back. The encoded audio data is acquired by specifying the location in the encoded data storage area 550 (MediaData-Box (mdat)) based on the location information indicating the location in the media file stored in the metadata. In S408, the audio encoding/decoding processing unit 110 decodes the audio data to be played back, and in S409, temporarily stores the decoded audio data in the buffer. In S410, the image encoding/decoding processing unit 105 acquires image data in the order in which images are to be displayed in the slideshow. The image data is acquired by specifying the location in the encoded data storage area 550 (MediaData-Box (mdat)) based on the location information indicating the location in the media file stored in the metadata. In S411, the image encoding/decoding processing unit 105 decodes the image data to be displayed, and temporarily stores the decoded image data in the buffer in S412. In S413, it is determined whether the audio output of the media file generation apparatus (playback apparatus) is effective. This is determined by checking software settings, such as whether the audio output unit 111 is set to mute or whether the device is enabled. The determination also includes checking of hardware connections, such as whether an audio output device is provided. For example, it is determined whether a headphone or a speaker is connected. In a case where the audio output of the playback apparatus is effective (YES in S413), the process proceeds to S414, but otherwise (NO in S413) the process proceeds to S418. In S414, playback of the audio data stored in the buffer is started. Subsequently, in S418, the CPU 102 displays the image on the display unit 107 according to the attribute information described in the metadata and the display time determined by the application. The processes from S410 to S412 and S418 are executed repeatedly to sequentially display the images stored in the HEIF file on the display unit 107. Although not shown in the present embodiment, when all the images stored as the slideshow have been displayed, the CPU 102 may control the display unit 107 to repeat displaying from the first image or to end the displaying of slideshow display. When the playback of the audio data is complete (when the stored samples are played back to the end), control may be performed to play back the audio data repeatedly from the beginning, or to stop the playback of audio data only. The audio playback may be performed as specified by flags and/or the like included in the metadata of the slideshow with audio described above. In a case where the metadata specifies that the playback of the audio data is started after specific image data is displayed, the flow may be controlled in such a manner.

As described above, according to the present embodiment, by grouping audio and images to be used in a slideshow, it becomes possible to effectively associate the plurality of images and audio data stored in a HEIF file with the intention to be used in the slideshow. In addition, it becomes possible to easily identify and store the images by storing them as a group of images and audio data without storing them in a moving image format.

In addition, by storing derives images in a slideshow group, it is possible to display the derived images as a slideshow with audio. Examples of derived images are identity images (iden), grid images (grid), overlay images (iovl), and the like.

It is also possible to store a plurality of slideshow groups in one file using different group IDs, and it is also possible to store a plurality of slideshow representations in one file. In addition, by storing a plurality of images, audio, and playlist information for a slideshow playback in a single file, information for the slideshow playback can be handled as a single file, which results in improvement in portability.

Second Embodiment

In the first embodiment, a method has been described for associating one piece of audio (sound) data with a slideshow. In a second embodiment described below, a plurality of pieces of audio data are associated, and the plurality of pieces of audio data are switched during a slideshow. A media file generation apparatus according to the second embodiment has the same configuration as the configuration described in FIG. 1 according to the first embodiment. The media file generation process described above with reference to FIG. 2 can be applied to the second embodiment. However, in the process of storing audio data from S208 to S210 shown in FIG. 2, a specified pieces of audio data are stored. The process of generating metadata of a slideshow with audio (S211) and the playback flow are different from those according to the first embodiment. The description of the second embodiment will therefore focus on the process in S211 and the playback processing flow with reference to FIGS. 12, 13, 14, 15, and 16.

FIG. 12 illustrates a flowchart of a process of generating metadata of a slideshow with audio according to the present embodiment. This process starts from S1201. First, in S1202, the CPU 102 selects one or more pieces of image data to be displayed in the slideshow from image data to be stored in a HEIF file, and determines the display order thereof. In the present embodiment, information on the display time (period) of the images to be displayed in the slideshow stored in the HEIF file is not specified. That is, no values are specified when the file is generated, and arbitrary values are determined when the file is played back. However, the display time may be determined and stored in the file. Next, in S1203, the CPU 102 selects audio data to be played back when the slideshow is performed, and acquires an audio track ID from the metadata. In this process, a plurality of pieces of audio data may be selected, or only one piece may be selected. The selection process in S1202 and S1203 may be performed based on information set in advance in the media file generation apparatus 100 or based on an operation performed by a user via the user interface unit 108, or the like. Next, in S1204, a slideshow display image is selected such that the selected piece of audio data is started when the selected image is displayed in the slideshow. In a case where a plurality of pieces of audio data have been selected, the process of selecting the image is performed for each piece of audio data. When the images selected here are displayed in the slideshow, playback of the corresponding pieces of audio data is started.

Next, in S1205, the metadata processing unit 106 generates metadata of the group of the slideshow with audio and sets image item IDs in the order in which images are to be displayed. Next, in S1206, an audio track ID is inserted immediately before the image item ID stored in the group of the slideshow with audio and corresponding to the selected image that triggers the start of playback of the audio data. More specifically, the metadata processing unit 106 generates information (group information) for grouping images and audio data to be displayed and played back in the slideshow. This group information is stored as metadata in the area 519 (GroupsListBox (grpl)) shown in FIG. 5. In HEIF, group information on items such as image data and a track is stored in grpl. A group ID serving as group identification information and a group type are assigned to the group information thereby identifying the group in the HEIF file. In the present embodiment, in S1205 and S1206, the metadata processing unit 106 generates slideshow-with-audio group information (SlideshowWithAudioEntityToGroupBox) as group information. FIG. 13 shows a data format of SlideshowWithAudioEntityToGroupBox. The data format of EntityToGroupBox from which SlideshowWithAudioEntityToGroupBox is derived is common to that shown in FIG. 7. Note that it is not allowed to set track IDs consecutively. In the case of a file in which track IDs are stored consecutively, one of the track IDs is ignored in the playback. Alternatively, two pieces (or greater number of pieces) of audio data corresponding to two (or more) consecutive track IDs may be treated in the playback process as one pieces of audio data including a series of audio data. In this case, when the playback for the first track ID is completed, the subsequent track ID is played back. In a case where a track ID appears after the subsequent image item ID, the sound/voice of the newly appearing track ID is to be played back.

The metadata processing unit 106 generates data according to the data format shown in FIG. 13 and stores it in grpl (see the area 520 shown in FIG. 5). This SlideshowWithAudioEntityToGroupBox is Box for identifying a group of entities for the purpose of displaying a slideshow including a set of plurality of images with audio. The group type of this SlideshowWithAudioEntityToGroupBox is 'slda' as described in a description 1301, which indicates a group of tracks and items used for the slideshow with audio.

The data format shown in FIG. 13 is an extension from EntityToGroupBox. Therefore, group id in a description 701 and num_entries_in_group in a description 702 shown in FIG. 7 are specified separately.

In a description 1303, num_entries_in_group has the same value as that specified in description 702. In a description 703, entity_id indicates a track ID or an item ID. In S1205, the item IDs of the selected images to be displayed in the slideshow are specified in entity_id according to the order in which the images are to be displayed. Next, in S1206, a track ID is specified by inserting it into the item ID specified in S1205. Thereafter, flags in a description 1304 are set to identify whether it is an audio track or an image item. For example, audio_flag (having, for example, a value of 1) is defined. This means that when flags&audio_flag is positive (true), entity id is an audio track ID. When flags&audio_flag is negative (false), entity_id is an image item. Note that the slideshow-with-audio group stored in the HEIF file does not include information related the time (period) at which the stored images are to be reproduced and displayed. In this case, since the audio track stored in the HEIF file is presentation information associated with time information, there is a possibility that the playback of the audio track may end earlier. To handle the above situation, the flags shown in the description 1302 are used as information specifying the behavior to be performed when the playback of the audio track data ends in the middle of the playback of the slideshow. More specifically, audio_play_loop is defined (for example, as having a value of 1), and when flags&audio_play_loop is positive (true), the audio track is played repeatedly. On the other hand, when flags&audio_play_loop is negative (false), it is specified that even if the displaying of the slideshow continues after the playback of the audio track has been completely ended, no further audio playback is performed. Note that the above-described operation may be defined as default without using the flags. Note that ISOBMFF defines EditListBox (elst) in EditBox (edts) in TrackBox (trak). This Box has a Box structure to indicate mapping between the presentation time and the media time. Similarly, flags are also defined in this Box to specify whether or not to play the edit list repeatedly. That is, it is possible to specify whether the audio track is to be repeated. On the other hand, by using the flags provided in iaugEntityToGroupBox described above, it is possible to set whether or not to repeat the playback of the audio track. Thus, even when the same audio track is specified for a plurality of iaug groups, it is possible to specify whether or not to repeat the audio track for each individual group. In this case, it is preferable that the repetition setting specified using EditListBox is ignored (overwritten) and only the flags setting specified in iaugEntityToGroupBox is effective. On the other hand, the operation may be performed taking into account both flags settings. More specifically, in a case where either one of settings specifies repeating, the audio track is repeatedly played back as long as the images specified in the group continue to be displayed. Alternatively, playback of the audio track may be repeated, only in a case where both flags settings specify repeating. For example, when a slideshow is displayed for a period longer than the duration specified in the audio track duration, the audio track is repeatedly played back as long as the slideshow display is continued. In the present embodiment, the flags described in the description 1304 in FIG. 13 can specify whether an ID of interest is an audio track ID or an image item ID. That is, since assignment of 1 bit is enough for flags, it is possible to use the format shown in FIG. 14. More specifically, the flags in the description 1304 are modified to the flag with a 1-bit configuration as shown in the description 1401, and used to identify whether it is an audio track or an image item. In this case, the bit size alignment cannot be achieved. To handles this, the data format includes padding data specified in the description 1402 in order to adjust the alignment of the bit size. On the other hand, the playback of the audio track may be continued even after the display of the images specified in the slideshow group is finished. More specifically, audio_play_completely is defined (for example, as having a value of 4) in the same way as the flags for audio repetition setting. In a case where flags&audio_play_completely is positive (true), the playback of audio is continued even after the displaying of images in the slideshow is ended. When flags&audio_play_completely is negative (false), the playback of the audio track is terminated when the displaying of images in the slideshow ends even if the playback of the audio track is in progress.

Next, in, S1207, individually specified switching effects are set in the image attribute information of the selected images, and then in S1208 the process is ended.

In the preset embodiment, it is possible to indicate, using flags, whether entity id stored in SlideshowWithAudioEntityToGroupBox is an audio track ID or an image item ID. However, in a case where the track ID and the item ID can be uniquely identified, these flags are unnecessary. More specifically, this is the case when HEIF files with unif branding, and the case when SlideshowWithAudioEntityToGroupBox is stored in a top level in MetaBox (not a metaBox within a moovBox). On the other hand, by allowing it to identify by the flag whether the ID is an item ID or a track ID, it becomes possible to limit the range within which the ID value is acquired during the playback process, which results in an improvement in processing efficiency. In alternative method, audio data may be defined as an item and specified in entity id. In this case, a further process is required to define the association between the audio item and the actual audio data and to the definition. An example of storing values (data) in the internal structure of the HEIF file according to the flow described above is described with reference to FIG. 15. FIG. 15 is a diagram illustrating an example of a HEIF file output according to the present embodiment. In this example shown in FIG. 15, 1 is stored as item ID in PrimaryItemBox (pitm) in a description 1501. Note that PrimaryItemBox may be extended to specify a group ID of a group that identifies a slideshow with audio, by specifying an ID in the Box. More specifically, a group ID is specified to identify SlideshowWithAudioEntityToGroup (slda), which will be described later. In this case, 1001, which is a group_id described later, is specified as the ID. However, in that case, the ID value must be uniquely identifiable for the item ID and the group ID value. ItemInfoBox described in a description 1502 allows each image item to be identified by item_ID which indicates what type of image item identified by item_ID is. It is described here that the image item whose item_ID is 1 has a type of 'hvc1', which indicates that this image item is an HEVC-encoded image. Similarly, all image items with up to item_ID 48 are stored as HEVC-encoded images. ItemLocationBox (iloc) described in a description 1503 indicates the storage location in the file of each image data bitstream. In ItemPropertyContainerBox (ipco) in ItemPropertiesBox (iprp) described in a description 1504, ItemProperty indicating image attribute information is stored, where hvcC indicates an HEVC encoding parameter, and ispe is attribute information indicating an image size. A description 1505 describes ItemPropertyAssociationBox (ipma) indicating the association between each image item and attribute information. Image items are associated with attribute information one by one in ipco. For example, item_ID 1 to item_ID 48 are associated with common ispe, which indicates a common image size. A description 1506 describes SlideshowWithAudioEntityToGroupBox(slda), where 1001 is specified as group id, and 50 is specified as the number of entries of the group. The specified entity id indicates a track ID of an audio track or an item ID of an image item, where entity id with flag=1 indicates a track ID, and entity id with flag=0 indicates an item ID. When this flag is set to 1, a track ID described in TrackHeaderBox in TrackBox, which will be described later, is referred to. On the other hand, when this flag is set to 0, a track ID described in ItemInfoBox in the description 1502 described above is referred to. As a result, even in a case where the ID value cannot be uniquely identified, it is possible to determine whether to refer to an item ID or a track ID. That is, information is stored for playing back and displaying the slideshow with audio.

Descriptions 1507 and 1508 each describe TrackBox (trak) stored in MovieBox (moov), where information on an audio presentation is stored in the Box structure. TrackBox further stores TrackHeaderBox (tkhd) and MediaBox (mdia). In TrackHeaderBox, flags indicates 3, which indicates that this track contains audio data. It is described in the description 1507 that TrackID is 1, while it is described in the description 1508 that TrackID is 2, indicating that the ID is for an audio track. This is the ID value described as entity_id with flag=1 in SlideshowWithAudioEntityToGroupBox. Furthermore, MediaBox (mdia) stores MediaHeaderBox (mdhd), HandlerBox (hdlr), and MediaInformationBox (minf). MoovieHeaderBox, TrackHeaderBox, and MediaHeaderBox store information on a generation time, an edit time, a timescale, and a duration.

HandlerBox (hdlr) specifies 'soun' as hdlrType for identifying an audio track. Because of the audio track, MedialnformationBox (minf) stores SoundMediaHeaderBox (smhd). Information indicating the storage location of the encoded audio data is stored in DataInformationBox (dinf). Although details are not shown in the figure, information on each audio sample is stored in SampleTableBox (stbl). More specifically, information on audio encoding and/or the like is stored using SampleDescriptionBox (stsd). Information indicating the size of each sample is stored in SampleSizeBox (stsz). In addition, information related to audio samples is stored using TimeToSampleBox (stts), SampleToChunkBox (stsc), and ChunkOffsetBox (stco).

In the present embodiment, as described above, audio and images for playing back and displaying a slideshow with audio are grouped together, and attribute information on each image is applied to the image when the slideshow is performed. However, different configurations may be employed as long as a plurality of pieces of audio data and a plurality of images are grouped and stored. For example, a plurality of groups of slideshow with one piece of audio data each of which is based on the first embodiment may be formed first and then these groups may be grouped to form a group of slideshow with a plurality of pieces audio. More specifically, one slideshow with audio is defined in SlideshowWithAudioEntityToGroupBox shown in FIG. 6, and then the group ID of SlideshowWithAudioEntityToGroupBox is stored as entity id in SlideshowEntityToGroupBox shown in FIG. 11. Similarly, a plurality of slideshows with audio using an iaug entity group based on the first embodiment may be formed, and the group ID may be stored in the entity_id of SlideshowEntityToGroupBox. Thus, in an HEIF file storing a plurality of groups of slideshow with audio, it becomes possible to specify the playback order of these groups, which makes it possible to play back the slideshows in a more effective manner. Furthermore, in the present embodiment, by extending the slideshow group, it becomes possible to store an audio track ID. Note that, by performing similar extension, it becomes possible to configure a group to include a mixture of track IDs and item IDs not only in slideshows but also in other entity groups. Alternatively, a data format for SlideshowWithAudioEntityToGroupBox may be configured such that image items are specified by entity_id in the order in which images are to be displayed, and audio track IDs are specified in another list. Image item IDs specifying audio track IDs which are to be played in response to displaying corresponding images may be added to the list of audio track IDs thereby achieving a group in which playback of audio is switched. Still alternatively, a data format for SlideshowWithAudioEntityToGroupBox may be configured such that audio track IDs and image item IDs are specified and the index information specifies image items and corresponding audio track IDs to be played back in response to displaying the corresponding images.

Slideshow Playback Process

Figure 16:
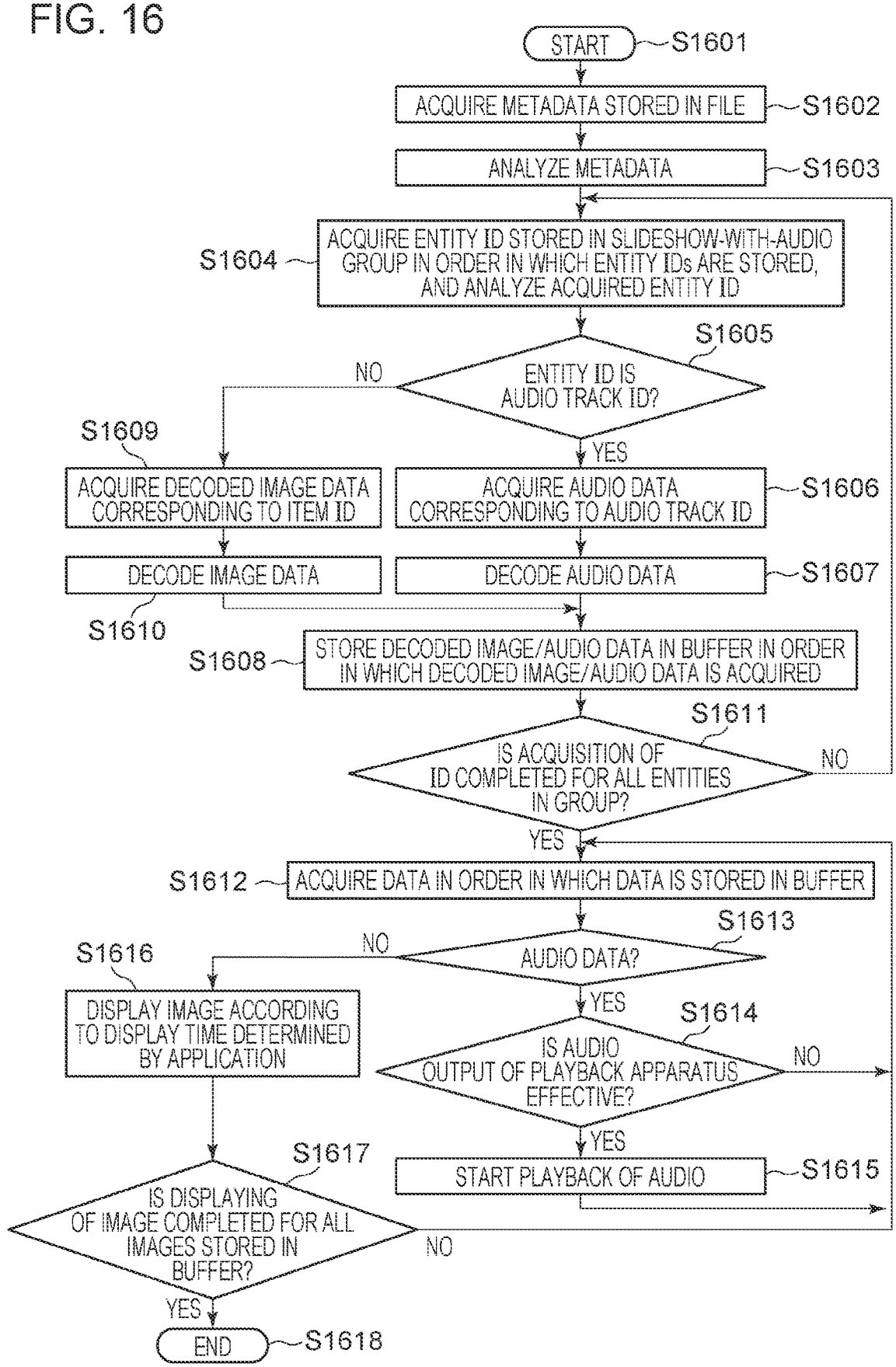
FIG. 16 is a flowchart illustrating a process performed by a media file generation apparatus to play back a slideshow according to the second embodiment.

Next, a process of playing a slideshow stored in a media file is described with reference to FIG. 16. Note that in the playback processing flow shown in FIG. 16, it is assumed that a group of slideshow with audio is stored in the media file. In a case where it is determined NO in S404 or S405 in FIG. 4, the following processing flow is similar to that shown in FIG. 4, and thus a description thereof is omitted. FIG. 16 is a flowchart illustrating a process of playing a slideshow in a media file. More specifically, FIG. 16 illustrates a processing flow of playing a file in which one or more still images according to the HEIF file format are stored. Each step in the flowchart in FIG. 16 represents a process executed by software by the CPU 102, the image encoding/decoding processing unit 105, the metadata processing unit 106, or the audio encoding/decoding processing unit 110. In the following description, the description of "CPU 102" means a software process executed by the CPU 102.

The playback of the slideshow described in the media file starts from S1601. First, in S1602, the CPU 102 acquires metadata stored in the metadata storage area 510 (MetaBox (meta)) from the HEIF file stored on the RAM 103 or the ROM 104. Next, in S1603, the CPU 102 analyzes the metadata acquired in S1602. In S1604, entity IDs stored in the group of slideshow with audio are acquired in the order in which the entity IDs are stored, and the acquired entity IDs are analyzed.

In S1605, it is determined whether the analysis indicates that the entity ID is an audio track ID. More specifically, the value of flags shown in FIG. 13 is checked to determine whether the flag value indicates audio. In a case where an audio track ID is indicated (YES in S1605), the process proceeds to S1606, but otherwise (NO in S1606), the process proceeds to S1609. In a case where the process proceeds S1609, the media file generation apparatus 100 executes a process to decode an encoded image data stored in the HEIF file. In S1609 and S1610, the encoded data of the image corresponding to the item ID is acquired and decoded, and the process proceeds to S1608.

In S1606, metadata of the audio track ID corresponding to the entity ID is acquired. More specifically, the metadata on the audio track is acquired from the metadata stored in the storage area 530 (MoovieBox (moov)). The audio encoding/decoding processing unit 110 analyzes the acquired metadata and acquires encoded audio data to be played back. The encoded audio data is acquired by specifying the location in the encoded data storage area 550 (MediaDataBox (mdat)) based on the location information indicating the location in the media file stored in the metadata. In S1607, the audio encoding/decoding processing unit 110 decodes the audio data to be played back, and the process proceeds to S1608.

In S1608, the decoded image data or audio data are temporarily stored in the buffer in the order in which the decoded data is acquired.

In S1611, it is determined whether all the entity IDs stored in the group of slideshow with audio have been acquired and the decoding of the encoded data of corresponding images or audio has been completed. In a case where the processes corresponding to all entity IDs have not been completed (NO in S1611), the process proceeds to S1604 to repeat the processes up to S1611. In a case where the processes have been completed (YES in S1611), the process proceeds to S1612. In the above-described flow according to the present embodiment, encoded data corresponding to all entity IDs are decoded and all the decoded data are stored in the buffer. However, the processes may be performed in parallel. In that case, subsequent display/playback processing and decoding processing are performed in parallel. Furthermore, in this case, the decoding process of next data must be completed before displaying and playback are performed, although it is allowed to reduce the buffer capacity.

Next, in S1612, decoded data of the image data and the audio data stored in the buffer in the processes up to S1611 are acquired in the order in which the image data and the audio data are stored in the buffer. In a case where it is determined in S1613 that the acquired decoded data is audio data (YES in S1613), the process proceeds to S1614, but otherwise (NO in S1613), the process proceeds to S1616. In S1614, it is determined whether the audio output of the media file generation apparatus (playback apparatus) is effective. This is determined by checking software settings, such as whether the audio output unit 111 is set to mute or whether the device is enabled. The determination also includes checking of hardware connections, such as whether an audio output device is provided. For example, it is determined whether a headphone or a speaker is connected. In a case where the audio output of the playback apparatus is effective (YES in S1614), the process proceed to S1615, but otherwise (NO in S1614) the process proceed to S1612 to repeat the processing. In S1615, playback of the audio data stored in the buffer is started. In a case where playback of another audio is in progress, the playback is switched from the audio being currently played back to the acquired audio data. Then, the process proceeds to S1612 to repeat the process.

Subsequently, in S1616, the CPU 102 displays the image on the display unit 107 according to the attribute information described in the metadata and the display time determined by the application. Then, in S1617, it is determined whether or not all images of the slideshow group stored in the buffer have been displayed. In a case where all the images have been displayed, the process proceeds to S1618, and the process is ended. If not, the process proceeds to S1612 and the process is repeated.

Although not shown in the present embodiment, when all the images stored as the slideshow have been displayed, the CPU 102 may control the display unit 107 to repeat displaying from the first image or to end the displaying of slideshow display. When the playback of the audio data is complete (when the stored samples are played back to the end), control may be performed to play back the audio data repeatedly from the beginning, or to stop the playback of audio data only. The audio playback may be performed as specified by flags and/or the like included in the metadata of the slideshow with audio described above. In a case where the metadata specifies that the playback of the audio data is started after specific image data is displayed, the flow may be controlled in such a manner.

In the present embodiment, as described above, one or more images and one or more pieces of audio data to be displayed and played back in a slideshow with audio are grouped together, and attribute information of each image is applied to the image when the slideshow with audio is performed.

As described above, according to the present embodiment, by grouping audio and images to be used in a slideshow, it becomes possible to effectively associate the plurality of images and audio data stored in a HEIF file with the intention to be used in the slideshow. In addition, it becomes possible to easily identify and store the images by storing them as a group of images and audio data without storing them in a moving image format. In addition, by storing derives images in a slideshow group, it is possible to display the derived images as a slideshow with audio. Examples of derived images are identity images (iden), grid images (grid), overlay images (iovl), and the like. It is also possible to store a plurality of slideshow groups in one file using different group IDs, and it is also possible to store a plurality of slideshow representations in one file. In addition, it is possible to apply a plurality of audio tracks to one slideshow, which makes it possible to play back the slideshow with audio in a more flexible manner. In addition, by storing a plurality of images, audio, and playlist information for a slideshow playback in a single file, information for the slideshow playback can be handled as a single file, which results in improvement in portability.

Various embodiments have been described above in terms of the media file generation process and the process of generating metadata of a slideshow with audio stored in the media file. The HEIF media file generated according to each embodiment has a structure in which ftyp, meta, moov, and mdat are arranged in the highest level in hierarchy, as shown in FIG. 5. However, the HEIF file generated by the media file generation apparatus is not limited to having this internal structure. For example, a HEIF file is generated according to one of the above-described embodiments, and then moving image data may be stored together in the HEIF file.

In a case where a HEIF file includes a sequence of temporally continuous still images, the sequence of still images must be defined as a video track in the HEIF file such that an image display application can successively display the images. The HEIF file may have to have a file structure which includes, in addition to meta, moov metadata for moving images. In each of the embodiments described above, a HEIF file is generated such that information of a plurality of pieces of image data for slideshow is stored in meta. This makes it possible to generate HEIF files more efficiently than generating HEIF files so as to store a sequence of images.

In the above embodiments, HEIF is used as an example of the file format, but any other file format may be used as long as it allows a plurality of pieces of image data and one or more pieces of audio data to be stored in one file and metadata associated with them to be held in the file.

A computer program (software) for performing part or all of control to realize a function of one of the embodiments described above may be supplied to an imaging apparatus or an information processing apparatus via a network or various types of storage media.

A computer (or a CPU, an MPU, or the like) in the imaging apparatus or the information processing apparatus may read the program and execute it.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A media file generation apparatus configured to generate a media file according to a predetermined file format having a data area for storing a plurality of pieces of image data and one or more audio data, and a metadata area for storing metadata related to the plurality of pieces of image data and the one or more audio data, the media file generation apparatus comprising:
   one or more processors; and
   one or more memories storing instructions executable by the one or more processors to cause the media file generation apparatus to perform:
   generating an information data structure comprising a plurality of pieces of identification information identifying each of the plurality of pieces of image data and each of the one or more audio data;
   selecting, for each of one or more groups, one or more image data among the plurality of pieces of image data and audio data among the one or more audio data;
   generating, for each of the one or more groups, a first grouping data structure comprising (1) a first group identification information and (2) a plurality of pieces of identification information identifying each of selected image data among the plurality of pieces of image data;
   generating, for each of the one or more groups, a second grouping data structure comprising (1) the first group identification information and (2) identification information identifying selected audio data associated with the first group identification information; and
   storing the information data structure, the first grouping data structure and the second grouping data structure in the metadata area, and storing the plurality of pieces of image data and the one or more audio data in the data area, in a single media file.

2. The media file generation apparatus according to claim 1, further performing:
   generating the first grouping data structure such that an order in which the selected image data among the plurality of pieces of image data are to be displayed is specified by an order in which the plurality of pieces of identification information are listed in the first grouping data structure.

3. The media file generation apparatus according to claim 1, wherein one or more image data of the plurality of pieces of image data correspond to one or more derived images constituting a plurality of sub-images.

4. The media file generation apparatus according to claim 1, wherein the first grouping data structure includes type information for indicating that a type of displaying the selected image data among the plurality of pieces of image data is at least one of slideshow, panorama, stereo and burst.

5. The media file generation apparatus according to claim 1, further performing:
   obtaining a plurality of pieces of audio data,
   generating a third grouping data structure for grouping the plurality of pieces of audio data, and
   storing the third grouping data structure for grouping the plurality of pieces of audio data in the metadata area.

6. The media file generation apparatus according to claim 1, wherein the second grouping data structure includes four character code "iaug" described in EntityToGroupBox defined by ISOBMFF standard.

7. The media file generation apparatus according to claim 2, wherein the first grouping data structure includes four character code "slid" described in EntityToGroupBox defined by ISOBMFF standard.

8. The media file generation apparatus according to claim 1, further performing:
   generating flag information indicating whether a playback of the selected audio data specified to be played back is to be repeated or not, in a case where the playback of the selected audio data finishes during the selected image data among the plurality of pieces of image data are displayed, and
   storing the flag information in the metadata area.

9. The media file generation apparatus according to claim 1, wherein the predetermined file format is HEIF (High Efficiency Image File Format).

10. A media file playback apparatus configured to play back a media file according to a predetermined file format having a data area for storing a plurality of pieces of image data and one or more audio data, and a metadata area for storing metadata related to the plurality of pieces of image data and the one or more audio data, the media file playback apparatus comprising:
   one or more processors; and
   one or more memories storing instructions executable by the one or more processors to cause the media file generation apparatus to perform:
   obtaining a media file including (i) an information data structure comprising a plurality of pieces of identification information identifying each of the plurality of pieces of image data and each of the one or more audio data, (ii) a first grouping data structure, for each of one or more groups, comprising (1) a first group identification information and (2) a plurality of pieces of identification information identifying each of selected image data among the plurality of pieces of image data, (iii) a second grouping data structure for each of the one or more groups, comprising (1) the first group identification information and (2) identification information identifying selected audio data among the one or more audio data and associated with the first group identification information; and
   playing back the selected image data and the selected audio data based on the obtained media file.

11. The media file playback apparatus according to claim 10, wherein the media file further includes flag information indicating whether a playback of the selected audio data specified to be played back is to be repeated or not, in a case where the playback of the selected audio data finishes during the selected image data among the plurality of pieces of image data are displayed, and
   the playback of the selected audio data is repeated, in a case where the flag information indicates that the playback of the selected audio data is to be repeated in a case where the playback of the selected audio data finishes during the selected image data among the plurality of pieces of image data are displayed.

12. A method of generating a media file according to a predetermined file format having a data area for storing a plurality of pieces of image data and one or more audio data and a metadata area for storing metadata related to the plurality of pieces of image data and the one or more audio data, the method comprising:
   generating an information data structure comprising a plurality of pieces of identification information identifying each of the plurality of pieces of image data and each of the one or more audio data;
   selecting, for each of one or more groups, one or more image data among the plurality of pieces of image data and audio data among the one or more audio data;
   generating, for each of the one or more groups, a first grouping data structure comprising (1) a first group identification information and (2) a plurality of pieces of identification information identifying each of selected image data among the plurality of pieces of image data;
   generating, for each of the one or more groups, a second grouping data structure comprising (1) the first group identification information and (2) identification information identifying selected audio data associated with the first group identification information; and
   storing the information data structure, the first grouping data structure and the second grouping data structure in the metadata area, and storing the plurality of pieces of image data and the one or more audio data in the data area, in a single media file.

13. A method of playing back a media file according to a predetermined file format having a data area for storing a plurality of pieces of image data and one or more audio data and a metadata area for storing metadata related to the plurality of pieces of image data and the one or more audio data, the method comprising:
   obtaining a media file including (i) an information data structure comprising a plurality of pieces of identification information identifying each of the plurality of pieces of image data and each of the one or more audio data, (ii) a first grouping data structure, for each of one or more groups, comprising (1) a first group identification information and (2) a plurality of pieces of identification information identifying each of selected image data among the plurality of pieces of image data, (iii) a second grouping data structure, for each of the one or more groups, comprising (1) the first group identification information and (2) identification information identifying selected audio data among the one or more audio data and associated with the first group identification information; and
   playing back the selected image data and the selected audio data based on the obtained media file.

14. A non-transitory computer-readable medium storing a program configured to cause a computer to execute a method according to claim 12, when loaded into and executed by the computer.

15. A non-transitory computer-readable medium storing a program configured to cause a computer to execute a method according to claim 13, when loaded into and executed by the computer.

16. The media file generation apparatus according to claim 1, further performing;
   in a case where a plurality of first grouping data structures and a plurality of second grouping data structures are generated, each of the plurality of first grouping data structures comprising (1) first group identification information and (2) a plurality of pieces of identification information identifying each of selected image data among the plurality of pieces of image data, and each of the plurality of second grouping data structures comprising (1) corresponding first group identification information and (2) identification information identifying selected audio data associated with the corresponding first group identification information,
   storing the information data structure, the plurality of first grouping data structures and the plurality of second grouping data structures in the metadata area, and storing the plurality of pieces of image data and the one or more audio data in the data area, in a single media file.

\* \* \* \* \*